(12) United States Patent
Olsson et al.

(10) Patent No.: US 8,594,074 B2
(45) Date of Patent: Nov. 26, 2013

(54) CALL SETUP FOR ACCESS DIVISION MULTIPLEXING

(75) Inventors: Magnus Olsson, Stockholm (SE); Göran Rune, Linköping (SE); Per Synnergren, Luleå (SE); Erik Westerberg, Enskede (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 169 days.

(21) Appl. No.: 12/943,736

(22) Filed: Nov. 10, 2010

(65) Prior Publication Data

US 2011/0149907 A1 Jun. 23, 2011

Related U.S. Application Data

(60) Provisional application No. 61/287,575, filed on Dec. 17, 2009, provisional application No. 61/287,623, filed on Dec. 17, 2009, provisional application No. 61/287,438, filed on Dec. 17, 2009, provisional application No. 61/287,627, filed on Dec. 17, 2009, provisional application No. 61/287,630, filed on Dec. 17, 2009, provisional application No. 61/287,954, filed on Dec. 18, 2009.

(51) Int. Cl.
*H04L 12/66* (2006.01)

(52) U.S. Cl.
USPC ............ 370/352; 370/33; 370/332; 370/323

(58) Field of Classification Search
USPC .................................. 370/331, 332, 352, 353
See application file for complete search history.

(56) References Cited

U.S. PATENT DOCUMENTS 6,122,270 A * 9/2000 Whinnett et al. ............. 370/342
6,463,054 B1 * 10/2002 Mazur et al. .................. 370/352

(Continued)

FOREIGN PATENT DOCUMENTS

EP    1740007 A1    1/2007
EP    2197236 A1    6/2010

(Continued)

OTHER PUBLICATIONS

3GPP TS 24.008, V10.1.0; 3rd Generation Partnership Project; Technical Specification Group Core Network and Terminals; Mobile Radio Interface Layer 3 Specification; Core Network Protocols; Stage 3 (Release 10); Dec. 2010.

(Continued)

*Primary Examiner* — Ricky Ngo
*Assistant Examiner* — Dewanda Samuel
(74) *Attorney, Agent, or Firm* — Nixon & Vanderhye, P.C.

(57) ABSTRACT

A wireless terminal (30) is capable of communicating with a first network (22-1) and a second network (22-1, 22-3), the first network (22-1) being an LTE network. A wireless terminal method comprises (prior to making a request to participate in a circuit switched call with the second network) the wireless terminal (30) camping on a respective selected cell (of each of the first network and the second network and thereby having tuned to both the selected cell for the first network and the selected cell for the second network. In view of already camping on the selected cell of the second network, the wireless terminal (30) does not make a measurement with respect to a cell of the second network in a time period between the making of the request to participate in the circuit switch call and actual establishment of the circuit switched call with the second network.

23 Claims, 17 Drawing Sheets

(56) References Cited

U.S. PATENT DOCUMENTS

| | | | |
|---|---|---|---|
| 6,560,457 B1 * | 5/2003 | Silver et al. | 455/445 |
| 6,608,832 B2 | 8/2003 | Forslöw | |
| 6,751,472 B1 * | 6/2004 | Muhonen | 455/553.1 |
| 6,904,058 B2 | 6/2005 | He et al. | |
| 7,463,901 B2 | 12/2008 | Svedberg et al. | |
| 8,045,985 B2 * | 10/2011 | Ahn | 455/435.2 |
| 8,107,954 B2 | 1/2012 | Islam et al. | |
| 8,125,960 B2 * | 2/2012 | Iwamura et al. | 370/331 |
| 8,144,696 B2 | 3/2012 | Kallio et al. | |
| 8,219,085 B2 * | 7/2012 | Mittal et al. | 455/434 |
| 8,320,291 B2 * | 11/2012 | Rune et al. | 370/312 |
| 8,358,629 B2 * | 1/2013 | Grilli et al. | 370/332 |
| 2003/0109256 A1 * | 6/2003 | Holcman | 455/436 |
| 2004/0043793 A1 | 3/2004 | Sakata | |
| 2005/0043046 A1 * | 2/2005 | Lee | 455/502 |
| 2006/0073831 A1 | 4/2006 | Guyot et al. | |
| 2007/0207824 A1 * | 9/2007 | Bhattacharjee et al. | 455/513 |
| 2008/0194264 A1 | 8/2008 | Eckert et al. | |
| 2009/0010247 A1 | 1/2009 | Stille | |
| 2009/0036131 A1 * | 2/2009 | Diachina et al. | 455/436 |
| 2009/0086674 A1 | 4/2009 | Ejzak | |
| 2009/0238143 A1 * | 9/2009 | Mukherjee et al. | 370/331 |
| 2009/0276532 A1 | 11/2009 | Bishop | |
| 2010/0085962 A1 * | 4/2010 | Issaeva et al. | 370/355 |
| 2010/0113010 A1 | 5/2010 | Tenny et al. | |
| 2010/0135200 A1 | 6/2010 | Karaoguz et al. | |
| 2010/0173667 A1 | 7/2010 | Hui et al. | |
| 2010/0177669 A1 | 7/2010 | Suo et al. | |
| 2010/0202413 A1 * | 8/2010 | Vikberg et al. | 370/332 |
| 2011/0110326 A1 | 5/2011 | Rexhepi et al. | |
| 2011/0149852 A1 | 6/2011 | Olsson et al. | |
| 2011/0149853 A1 | 6/2011 | Olsson et al. | |
| 2011/0149907 A1 | 6/2011 | Olsson et al. | |
| 2011/0149908 A1 | 6/2011 | Olsson et al. | |
| 2011/0149925 A1 | 6/2011 | Olsson et al. | |
| 2011/0151874 A1 | 6/2011 | Olsson et al. | |
| 2012/0113900 A1 | 5/2012 | Shaheen | |

FOREIGN PATENT DOCUMENTS

| | | |
|---|---|---|
| WO | 0101720 A1 | 1/2001 |
| WO | 2004057894 A1 | 7/2004 |
| WO | 2008/088245 A1 | 7/2008 |
| WO | 2008087518 A2 | 7/2008 |
| WO | 2008088243 | 7/2008 |
| WO | 2008088245 A1 | 7/2008 |
| WO | 2008088258 A1 | 7/2008 |
| WO | 2009000696 A1 | 12/2008 |
| WO | WO2008148432 A1 * | 12/2008 |
| WO | 2009044458 A1 | 4/2009 |
| WO | 2009/087099 A1 | 7/2009 |
| WO | 2009/084146 A1 | 9/2009 |
| WO | 2010146468 A2 | 12/2010 |
| WO | 2011073847 A2 | 6/2011 |
| WO | 2011073847 A3 | 6/2011 |
| WO | 2011073849 A1 | 6/2011 |
| WO | 2011073884 A1 | 6/2011 |
| WO | 2011073946 A1 | 6/2011 |

OTHER PUBLICATIONS

International Search Report and Written Opinion mailed Apr. 26, 2011 in PCT application PCT/IB2010/055609.

3GPP TS 36.331 V8.9.0; Technical Specification Group Radio Access Network; Evolved Universal Terrestrial Radio Access (E-UTRA); Radio Resource Control (RRC); Protocol Specification (Release 8) (Mar. 2010).

International Search Report and Written Opinion mailed May 18, 2011 in PCT application PCT/IB2010/055816.

International Search Report and Written Opinion mailed May 17, 2011 in PCT application PCT/IB2010/055820.

International Search Report and Written Opinion mailed May 18, 2011 in PCT application PCT/IB2010/055888.

International Search Report and Written Opinion mailed Jun. 15, 2011 in PCT application PCT/IB2010/055601.

International Search Report and Written Opinion mailed May 13, 2011 in PCT application PCT/IB2010/055778.

3GPP TS 36.331 V10.1.0 3rd Generation Partnership Project; Evolved Universal Terrestrial Radio Access (E-UTRA); Radio Resource Control (RRC); Protocol Specification (Release 10) (Mar. 2011).

3GPP TS 23.272 V10.3.1, 3rd Generation Partnership Project; Technical Specification Group Services and System Aspects; Circuit Switched (CS) fallback in Evolved Packet System (EPS); Stage 2 (Release 10) (Apr. 2011).

General Packet Radio Service (GPRS) enhancements for Evolved Universal Terrestrial Radio Access Network (E-UTRAN) access, 3GPP Technical Specification, Mar. 2011, V10.3.0.

3GPP TS 25.331 V10.3.1, 3rd Generation Partnership Project; Technical Specification Group Radio Access Network; Radio Resource Control (RRC); Protocol Specification (Release 10) (Apr. 2011).

3GPP TS 23.272 V8.4.0, Digital Cellular Telecommunications System (Phase 2+); Universal Mobile Telecommunications System (UMTS); LTE; Circuit Switched (CS) Fallback in Evolved Packet System (EPS); Stage 2 (Release 8) Jun. 1, 2009.

U.S. Appl. No. 13/180,195, filed Jul. 11, 2011, entitled "Method and Apparatus for Transferring Telecommununications Connections".

U.S. Office Action mailed Mar. 6, 2013 in U.S. Appl. No. 12/943,685.

Office Action mailed Dec. 20, 2012 in U.S. Appl. No. 12/943,504.

Office Action mailed Oct. 1, 2012 in U.S. Appl. No. 12/943,801.

Office Action mailed Nov. 19, 2012 in U.S. Appl. No. 12/943,612.

Office Action mailed Dec. 11, 2012 in U.S. Appl. No. 12/943,770.

Office Action mailed Jul. 12, 2013 in U.S. Appl. No. 12/943,801.

Office Action mailed May 31, 2013 in U.S. Appl. No. 12/943,612.

* cited by examiner

CALL SETUP FOR ACCESS DIVISION MULTIPLEXING

RELATED APPLICATIONS

This application claims the priority of and is related to the following U.S. Provisional Patent Applications, all of which are incorporated herein by reference in their entireties:

U.S. Provisional Patent Application 61/287,575 to Magnus Olsson et al., entitled "GSM and LTE Multiplexing Systems", filed on Dec. 17, 2009.

U.S. Provisional Patent Application 61/287,623 to Magnus Olsson et al., entitled "Measurement Report Relay in Access Division Multiplexing Systems", filed on Dec. 17, 2009.

U.S. Provisional Patent Application 61/287,438 to Magnus Olsson et al., entitled "WCDMA and LTE Multiplexing", filed on Dec. 17, 2009.

U.S. Provisional Patent Application 61/287,627 to Magnus Olsson et al., entitled "Telecommunications Multiplexing", filed on Dec. 17, 2009.

U.S. Provisional Patent Application 61/287,630 to Magnus Olsson et al., entitled "Access Division Multiplexing— Call Setup Performance Improvement", filed on Dec. 17, 2009.

U.S. Provisional Patent Application 61/287,954 to Magnus Olsson et al., entitled "Scheduled Optimized for GSM and LTD Multiplexing", filed on Dec. 17, 2009.

This application is related to the following U.S. patent applications, all of which are filed on same date herewith and incorporated herein by reference in their entireties:

U.S. patent application Ser. No. 12/943,801 to Magnus Olsson et al., entitled "GSM and LTE Multiplexing".

U.S. patent application Ser. No. 12/943,770 to Magnus Olsson et al., entitled "Link Report Relay in Access Division Multiplexing Systems".

U.S. patent application Ser. No. 12/943,612 to Magnus Olsson et al., entitled "Keeping Packet Switched Session in LTE While Circuit Switched Registered in WCDMA".

U.S. patent application Ser. No. 12/943,685 to Magnus Olsson et al., entitled "Maintaining Packet Switched Session in LTE When Establishing GSM Circuit Switched Call".

U.S. patent application Ser. No. 12/943,504 to Magnus Olsson et al., entitled "Scheduling For Access Division Multiplexing".

TECHNICAL FIELD

This technology pertains to wireless communications networks, and particularly to call setup operations.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Serving Gateways, or SGWs) rather than to radio network controller (RNC) nodes. In general, in LTE the functions of a radio network controller (RNC) node are distributed between the radio base stations nodes (eNodeB's in LTE) and SGWs. As such, the radio access network (RAN) of an LTE system has an essentially "flat" architecture comprising radio base station nodes without reporting to radio network controller (RNC) nodes.

Cellular Circuit-Switched (CS) telephony was introduced in the first generation of mobile networks. Since then CS telephony has become the largest service in the world with approximately 4 billion subscriptions sold. Even today, the main part of the mobile operator's revenue comes from the CS telephony service (including Short Message Services (SMS)), and the 2G GSM networks still dominate the world in terms of subscriptions. 3G subscriptions are increasing in volume, but that increase is less in part because of users with handheld mobile terminals migrating from 2G to 3G and more as a result of mobile broadband implemented via dongles or embedded chipsets in laptops.

The long-term evolution (LTE) project within 3GPP aims to further improve the 3G standard to, among other things, provide even better mobile broadband to the end-users (higher throughput, lower round-trip-times, etc.).

A common view in the telecommunication industry is that the future networks will be all-IP networks. Based on this assumption, the CS domain in was removed in the LTE work. As a result, the telephony service cannot be used by a 3GPP Release 8 compliant LTE terminal, unless one of the following four things is done:

(1) Implement circuit switched (CS) fallback (CSFB), so that an LTE terminal falls back to 2G GSM when telephony service is used.

(2) Implement 3GPP IP Multimedia Subsystem (IMS)/Multimedia Telephony (MMTel), which is a simulated CS telephony service provided over IP and IMS that inter-works with the Public Switched Telephone Network (PSTN)/Public Land Mobile Network (PLMN).

(3) Implement a tunneling solution with Unlicensed Mobile Access (UMA)/Generic Access Network (GAN) over LTE where the CS service is encapsulated into an IP tunnel.

(4) Implement a proprietary Voice over IP (VoIP) solution with PSTN/PLMN interworking.

All of these four possibilities have drawbacks. In deployed GSM networks that do not have Dual Transfer Mode (DTM) capabilities; CS and Packet Switched (PS) services cannot be used in parallel. Hence, all PS services running prior to a call to or from a terminal using Circuit Switched Fallback (CSFB) are put on hold or are terminated. If the GSM network has DTM, the PS performance will be greatly reduced (from 10's of Mbps to 10's to 100's of kbps). One drawback with the CS fallback approach is that when calling or being called and the terminal is falling back to GSM and the CS service from LTE. Circuit Switched Fallback (CSFB) also prolongs call set-up time.

The IMS/MMTel approach uses a completely new core/service layer that is IMS based. This provides new possibilities to enhance the service but also comes with the drawback of a financial hurdle for the operator to overcome. A new core network drives capital expenditures (CAPEX), and integration of that core network drives an initial operating expenditures (OPEX) increase. Further, the IMS/MMTel approach needs features implemented in the terminals and the legacy CS network in order to handle voice handover to/from the 2G/3G CS telephony service.

Using UMA/GAN over LTE is not a standardized solution so a drawback is that it is a proprietary solution which may make terminal availability a problem. It also adds additional functions to the core/service layer in both the network and terminal, e.g., a GAN controller in the network and GAN protocols in the UE terminal.

The proprietary VoIP approach, if operator controlled, comes with the same drawbacks as for the IMS/MMTel (new core/service layer) approach along with the difficulties associated with it being proprietary and handover to 2G/3G CS may not be supported.

There is yet a further solution for using a legacy CS telephony service with a wireless terminal such as a 3GPP release 8-compliant LTE terminal. In that further solution, also known as a type of Access Division Multiplexing (ADM), transmissions of GSM CS voice are interleaved in between LTE transmissions. See, e.g., PCT/SE2007/000358, which is incorporated herein by reference. In one example implementation of such an ADM solution a wireless terminal simultaneously communicates with two TDMA-based radio systems, e.g., the wireless terminal can maintain communications paths to both systems by means of alternating in time its communication between the two systems. The toggling between the two systems is on a time scale small enough to effectively yield a simultaneous communication between the two systems.

This further solution attempts to achieve a good PS connection in parallel with the telephony service when in LTE coverage but still reusing the legacy CS core and deployed GSM network for the telephony service to reduce costs but still maintain good coverage for the telephony service.

This further or ADM solution may be implemented in several ways. A first example implementation, illustrated in FIG. 1A, is a fully UE centric solution where no coordination is needed between the GSM CS core and a LTE PS core. A second example implementation, illustrated by FIG. 1B, is a network assisted solution which can either be based on circuit switched fallback (CSFB), or a solution that only reuses paging over LTE.

From a radio perspective, the solution can be realized in any of three different ways: As a first example radio realized embodiment illustrated in FIG. 2A, the LTE transmissions could be multiplexed with the GSM transmissions on a GSM TDMA frame level. This first example solution requires that the GSM CS telephony service only use the half rate codec.

When GSM is running at half rate, then every second GSM TDMA frame is not used by the user.

As a second example radio realized embodiment illustrated in FIG. 2B, the LTE transmissions could be multiplexed with the GSM transmissions on GSM burst level. GSM transmits speech using bursts, each with a duration of 0.577 ms. In speech operation, after having sent one burst, the Rx/Tx part sleeps for 7*0.577 ms until it wakes up again and do a new Rx/Tx process. In this second example this time gap could be used for LTE transmissions.

As a third example radio realized embodiment illustrated in FIG. 2C, any of above can be used for transmission but by using dual receiver for simultaneous reception of GSM and LTE in the downlink for simplified operation.

The architecture and principles of the circuit switched fallback (CSFB) are defined in, e.g., 3GPP TS 23.272, Circuit Switched Fallback in Evolved Packet System, Stage 2 (Release 8), which is abbreviated herein as "23.272" and which is incorporated herein by reference in its entirety. FIG. 3 shows example architecture for implementing an example embodiment of circuit switched fallback (CSFB). In the circuit switched fallback (CSFB) architecture and mode of FIG. 3 the following principles apply:

- Reuse the combined mobility management (MM) and serving gateways (SGs) interface in SAE/LTE as defined for CS fallback [23.272].
- The UE camps on LTE in CS Idle mode, CS paging and short message service (SMS) is sent via SGs and a mobility management entity (MME) as defined for CS fallback [23.272].
- Circuit switched (CS) non-access stratum (NAS) signaling over Global System for Mobile communication (GSM) in active Mode as defined for CS fallback [23.272].
- In active mode UE or network coordinate gaps in LTE GSM speech is allowed to be interleaved with LTE (as described, e.g., in PCT/SE2007/000358).
- Use the CS Fallback architecture and principles but do not release the LTE access when tuning to GSM to make or receive calls.

With architecture of the example type shown in FIG. 3 and assumptions the call setup performance will be similar to normal CS fallback (typically 0.5-2 s additional call setup time).

The call flows in the CS fallback specification [23.272] can be used to illustrate how the call establishment is impacted by measurements, tuning and reading of system information impacts the call setup delay. Similar call flows would be needed for the CSFB based architecture for "interleaving GSM voice in LTE" and the same issues with delays would appear.

FIG. 4 shows Mobile Originating call in Active Mode—PS HO supported (see, e.g., 3GPP TS 23.272: FIG. 6.2-1: CS Call Request in E-UTRAN, Call in GERAN/UTRAN). In other words, FIG. 4 represents a case for mobile-originated (MO) calls in active mode in which packet switched (PS) handover is supported. The call flows for mobile-terminated (MT) calls and UE's in idle mode is similar. The extra call setup delay compared to a normal call in 2G/3G are the steps 1, 2, and 3 of FIG. 4, where step 2 (measurements) is estimated to take roughly 1 s. As described in the figures, step 2 is optional (configurable in the eNodeB) but many operators indicate that they need to perform measurements in order to select the target cell.

FIG. 5 shows Mobile Originating call in Active Mode—No PS HO support (see 3GPP TS 23.272: FIG. 6.3-1: CS Call Request in E-UTRAN, Call in GERAN/UTRAN without PS HO). In other words, FIG. 5 represents a case for mobile-originated (MO) calls in active mode in which packet switched (PS) handover is not supported. The call flows for mobile-terminated (MT) calls and UE's in idle mode is similar. The extra call setup delay compared to a normal call in 2G/3G are the steps 1-8 of FIG. 5, where step 2 (measurements) is estimated to take roughly 1 s. As described in the figures, step 2 of FIG. 5 is optional (configurable in eNodeB) but many operators indicate that they need to perform measurements in order to select the target cell. In this case there is also is extra delays in between step 3 and 6 where the UE tunes to the target cell. When packet switched handover (HO) is not used this takes longer since less information is provided to the UE and the resources are not prepared in the target system. For example when RRC connection release with redirect is used, the UE needs to reselect a new cell according to the redirect information, tune to the cell and read system information (which may take a second or more).

SUMMARY

The technology disclosed herein concerns the problem of call setup delays for the case where network functionality is solved by reusing the architecture and principles defined for the 3GPP specified CS fallback feature [3GPP TS 23.272, Circuit Switched Fallback in Evolved Packet System, Stage 2 (Release 8)].

In one of its aspect the technology disclosed herein concerns a method of operating a wireless terminal capable of communicating with a first network and a second network, the first network being an LTE network. The wireless terminal method comprises (prior to making a request to participate in a circuit switched call with the second network) the wireless terminal camping on a respective selected cell of each of the first network and the second network and thereby having tuned to both the selected cell for the first network and the selected cell for the second network. The method further comprises making a request to participate in the circuit switched call through the second network. In view of already camping on the selected cell of the second network, the method further comprises establishing the circuit switched call with the second network without making a measurement with respect to a cell of the second network in a time period between the making of the request to participate in the circuit switch call and establishment of the circuit switched call with the second network.

In an example embodiment and mode the request to participate in a circuit switched call comprises either a request to establish the circuit switched call or a response to a page for the circuit switched call.

In an example embodiment and mode, in camping on the selected cell for the second network the wireless terminal has determined the selected cell of the second network to be a best cell of the second network for the wireless terminal and has acquired system information of the second network.

In one example embodiment and mode the wireless terminal method further comprises, in conjunction with the camping, the wireless terminal (being a dual receiver wireless terminal) listening to both the first network and the second network at a same time and thereby performing measurements on cells of the second network simultaneous with activity toward the first network.

In another example embodiment and mode, the wireless terminal method further comprises, in conjunction with the camping, the wireless terminal (being an interleaving wireless terminal) performing measurements on cells of the second network in gaps of transmissions with the first network.

In an example embodiment and mode the wireless terminal method further comprises the wireless terminal notifying a mobility management entity (MME) that the wireless terminal is capable of camping on both a cell of the first network and a cell of the second network.

In an example embodiment and mode the wireless terminal method further comprises the wireless terminal performing a Radio Resource Control (RRC) connection release and/or cell change order and/or a packet switch handover prior to the actual establishment of the circuit switched call with the second network.

In an example embodiment and mode the wireless terminal method further comprises, after the actual establishment of the circuit switched call with the second network, the wireless terminal maintaining and/or starting a packet switched session with the first network by interleaving transmissions of the circuit switched call and the packet switched session.

In another of its aspects the technology disclosed herein concerns a wireless terminal capable of communicating with a first network and a second network, the first network being an LTE network. The wireless terminal is configured to (prior to making a request to participate in a circuit switched call with the second network) camp on a respective selected cell of each of the first network and the second network and thereby tune to both the selected cell for the first network and the selected cell for the second network. The wireless terminal is further configured to make a request to participate in the circuit switched call through the second network and, in view of already camping on the selected cell of the second network, establish the circuit switched call with the second network without making a measurement with respect to a cell of the second network in a time period between the making of the request to participate in the circuit switch call and establishment of the circuit switched call with the second network.

In an example embodiment the wireless terminal comprises a communications interface and a dual camping unit. The communications interface is configured to enable the wireless terminal to communicate over a radio interface with a first radio access technology network and a second radio access technology network. The dual camping unit is configured to tune both to the selected cell for the first network and the selected cell for the second network prior to the wireless terminal making a request to participate in a circuit switched call with the second network.

In an example embodiment the wireless terminal further comprises a circuit switched call manager; a measurement unit; a dual camping notifier; a circuit switched (CS) call manager; and a packet switched session manager. The call setup unit is configured to request to participate in a circuit switched call by generating either a request to establish the circuit switched call or a response to a page for the circuit switched call. The dual camping notifier is configured to generate a notification message arranged to notify a mobility management entity (MME) that the wireless terminal is capable of camping on both a cell of the first network and a cell of the second network. The packet switched session manager is configured to maintaining and/or start a packet switched session with the first network by interleaving transmissions of the circuit switched call and a packet switched session after the actual establishment of the circuit switched call with the second network.

In one example embodiment the communications interface is configured to listen to both the first network and the second network at a same time, so that the measurement unit can perform measurements on cells of the second network simultaneous with activity toward the first network.

In another example embodiment the communications interface is configured to facilitate the measurement unit performing measurements on cells of the second network in gaps of transmissions with the first network.

In another of its aspects the technology disclosed herein concerns a method of operating a base station node of a first network (a Long Term Evolution (LTE) network) which communicates over a radio interface with a wireless terminal. The method comprises receiving an indication that the wireless terminal is capable of camping on both a cell of the first network and a cell of the second network (and therefore that the wireless terminal is capable of tuning to both a selected cell for the first network and a selected cell for the second network). The method further comprises, receiving a request from the wireless terminal to participate in a circuit switched call with the second network; and in response to the indication the wireless terminal is capable of camping on both a cell of the first network and a cell of the second network, refraining from requesting that the wireless terminal perform a measurement with respect to a cell of the second network in a time period between the receipt of the request to participate in the circuit switch call and actual establishment of the circuit switched call with the second network.

In an example mode and embodiment the method of operating the base station node further comprises the base station node scheduling communications between the first network and the wireless terminal in a manner to allow the wireless terminal to perform measurements with respect to cells of the second network in interleaved fashion with the communications between the first network and the wireless terminal.

In an example mode and embodiment the method of operating the base station node further comprises the base station node performing a Radio Resource Control (RRC) connection release procedure and/or cell change order and/or a packet switch handover procedure prior to the actual establishment of the circuit switched call with the second network.

In an example mode and embodiment the method of operating the base station node further comprises the base station node authorizing the wireless terminal to establish the circuit switched call with the second network, and thereafter maintaining and/or starting a packet switched session between the wireless terminal and the first network by interleaving transmissions of the circuit switched call and the packet switched session.

In another of its aspects the technology disclosed herein concerns a base station node of a Long Term Evolution (LTE) network which serves a dual camping wireless terminal. The base station node is configured to receive and store an indication that the wireless terminal is capable of camping on both a cell of the first network and a cell of the second network (and thereby capable of tuning to both a selected cell for the first network and a selected cell for the second network). The base station node is further configured to receive a request from the wireless terminal to participate in a circuit switched call with the second network; and (in response to the indication the wireless terminal is capable of camping on both a cell of the first network and a cell of the second network) to refrain from requesting that the wireless terminal for which the indication is stored perform a measurement with respect to a cell of the second network in a time period between the receipt of the request to participate in the circuit switch call and actual establishment of the circuit switched call with the second network.

In an example embodiment the base station node comprises a context memory and a measurement report solicitor. The context memory receives and stores the indication that the wireless terminal is capable of camping on both a cell of the first network and a cell of the second network and that the wireless terminal is thereby capable of tuning to both a selected cell for the first network and a selected cell for the second network. The measurement report solicitor is configured to refrain from requesting that the wireless terminal for which the indication is stored perform the measurement with respect to the cell of the second network in a time period between the receipt of the request to participate in the circuit switch call and actual establishment of the circuit switched call with the second network.

In an example embodiment the base station node further comprises a scheduler configured to schedule communications between the first network and the wireless terminal in a manner to allow the wireless terminal to perform measurements with respect to cells of the second network in interleaved fashion with the communications between the first network and the wireless terminal.

In an example embodiment the base station node further comprises a network transition controller. The network transition controller can take the form of at least one of a Radio Resource Control (RRC) connection controller; a cell change order controller; and a packet switch handover controller. The Radio Resource Control (RRC) connection controller is configured to perform a release Radio Resource Control (RRC) connection procedure prior to the actual establishment of the circuit switched call with the second network. The cell change order controller is configured to perform a cell change order prior to the actual establishment of the circuit switched call with the second network. The packet switch handover controller is configured to perform a packet switch handover procedure prior to the actual establishment of the circuit switched call with the second network.

In an example embodiment the base station node further comprises a scheduler configured to authorize the wireless terminal to establish the circuit switched call with the second network and thereafter maintain and/or start a packet switched session between the wireless terminal and the first network by interleaving transmissions of the circuit switched call and the packet switched session.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1A:
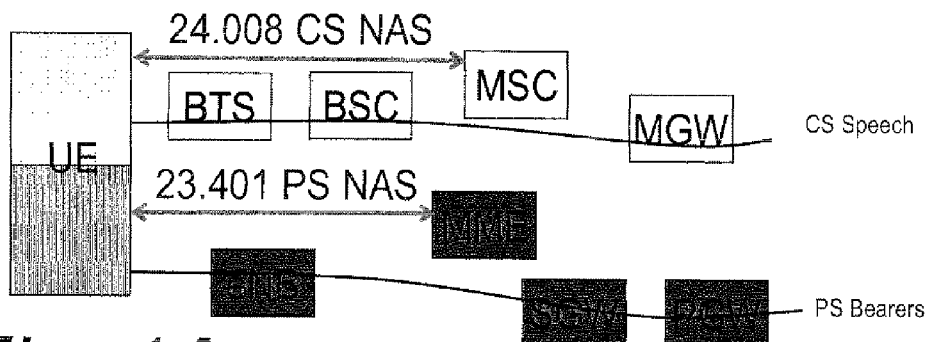
FIG. 1A is a diagrammatic view illustrating a fully UE centric solution ADM solution where no coordination is needed between a GSM CS core and a LTE PS core.
Figure 1B:
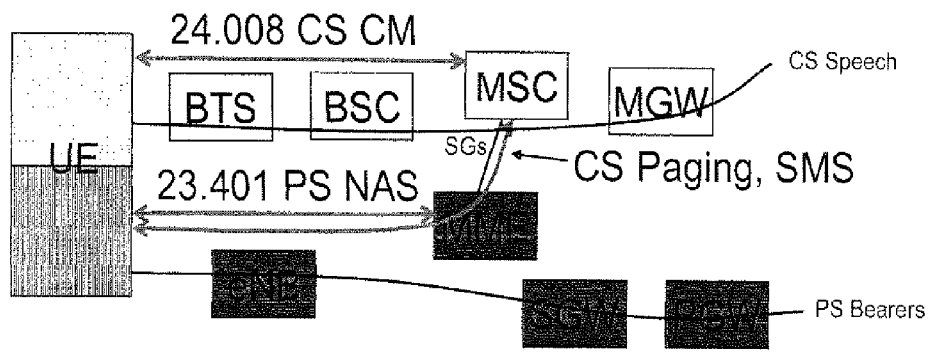
FIG. 1B is a diagrammatic view illustrating a network assisted access division multiplexing (ADM) solution which can either be based on CS fallback (CSFB), or a solution that only reuses paging over LTE.
Figure 2A:
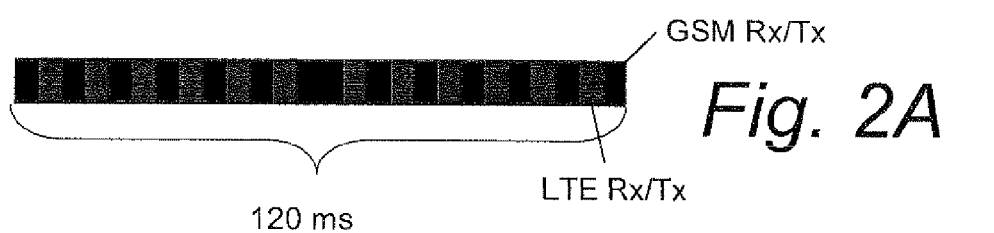
FIG. 2A, FIG. 2B, and FIG. 2C are diagrammatic views illustrating differing example radio-realized embodiments of access division multiplexing (ADM) solutions.
Figure 2B:
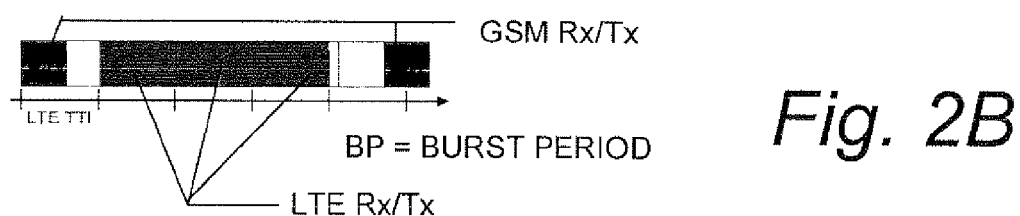
Figure 2C:
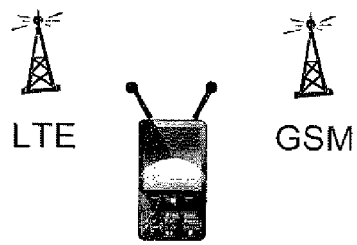

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 3:
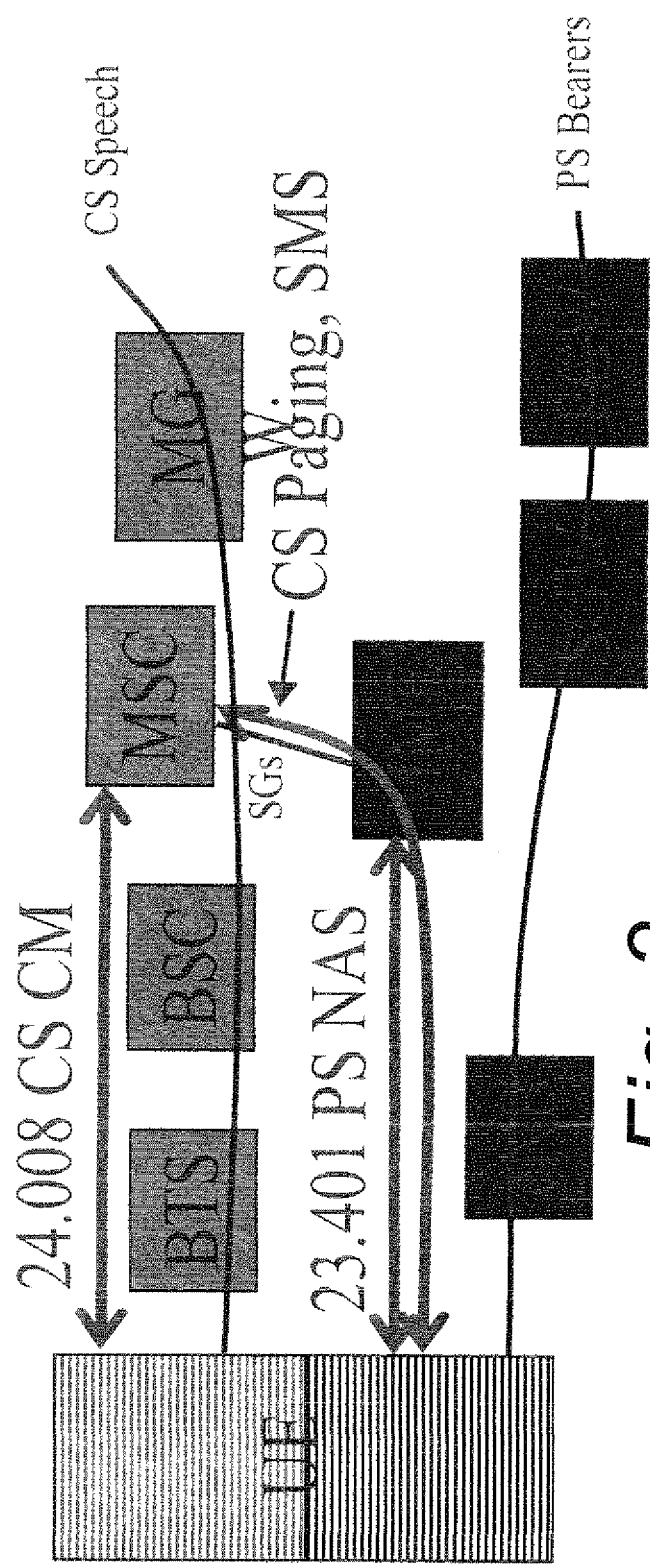
FIG. 3 is a diagrammatic view of example architecture for implementing an example embodiment and mode of access division multiplexing (ADM).
Figure 4:
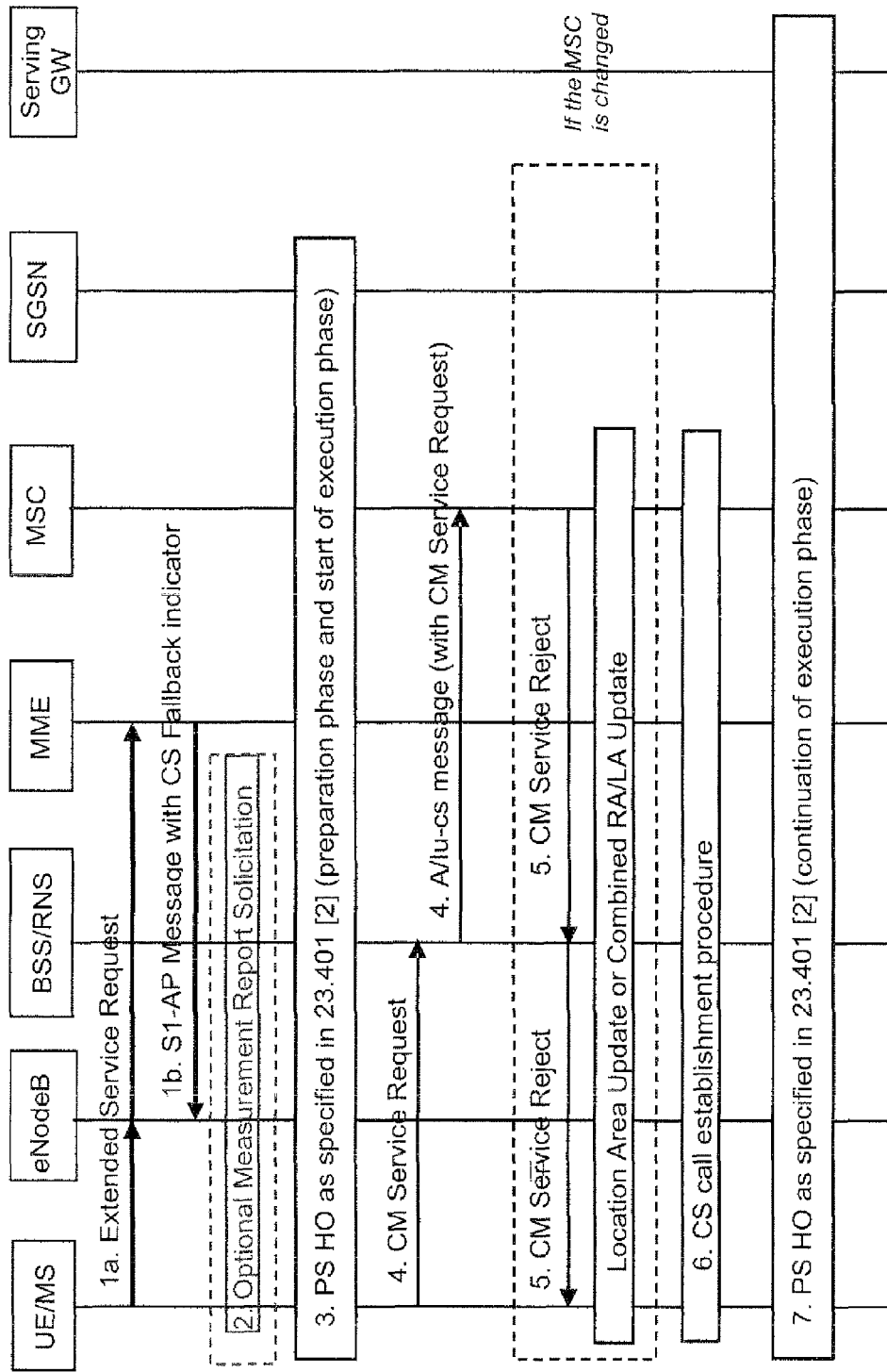
FIG. 4 is a diagrammatic view depicting acts performed in conjunction with a mobile originating call in active mode where packet switched (PS) handover (HO) is supported.
Figure 5:
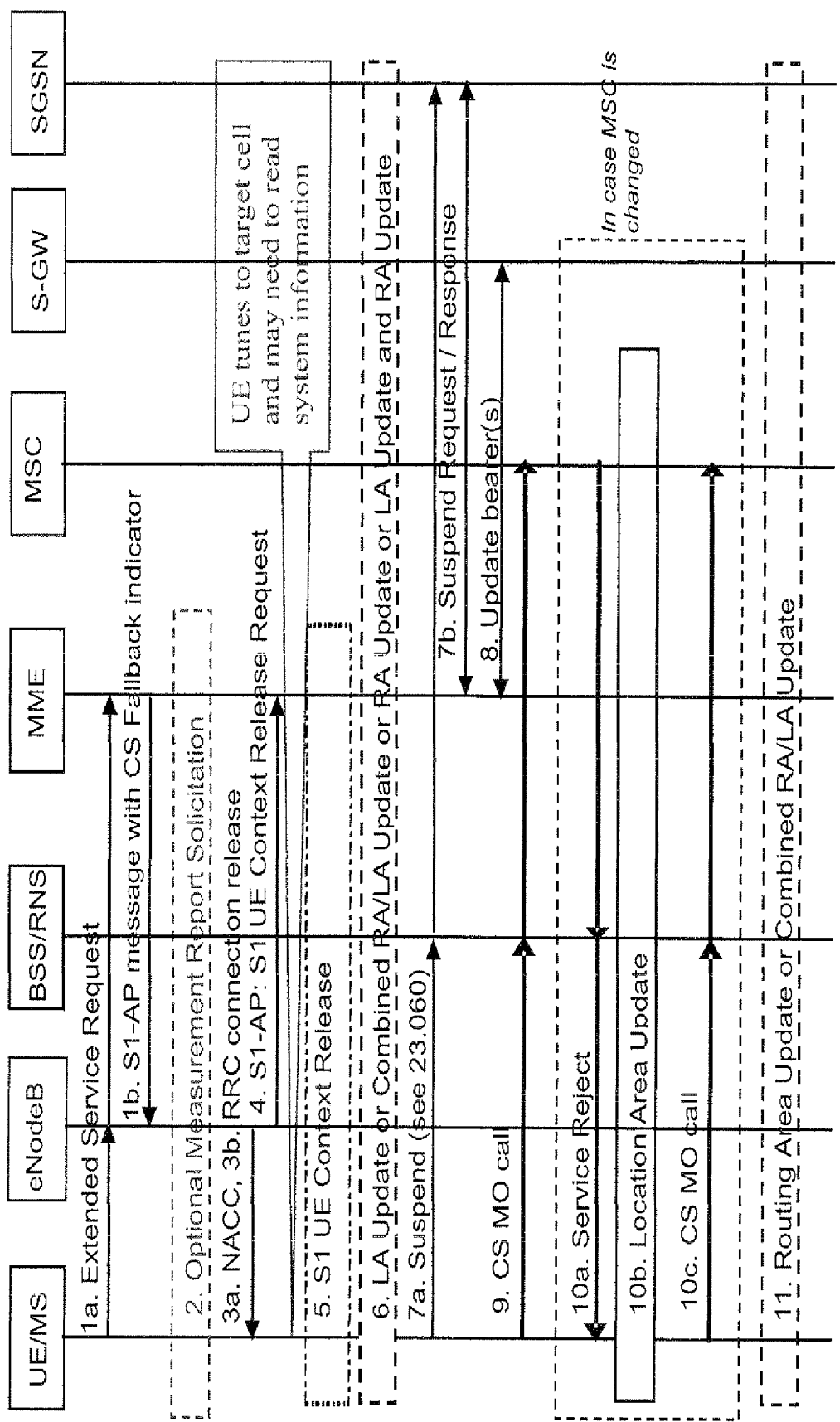
FIG. 5 is a diagrammatic view depicting acts performed in conjunction with a mobile originating call in Active Mode where packet switched (PS) handover (HO) is not support.

The time to establish a call is an important part of the user experience for voice services. Thus it is important to find solutions that can minimize or remove any additional call setup delay for solutions that interleave GSM voice and LTE. Some of the main contributions to the delays are measurements, tuning, and synchronizing with selected cell and reading system information. The technology disclosed herein thus concerns a problem of call setup delays, and is particularly advantageous for mitigating call set up delays when the network functionality uses the architecture and principles defined for the 3GPP specified circuit switched fallback (CSFB) [23.272] as illustrated by way of example in FIG. 3. The technology disclosed herein thus enhances call setup.

Figure 6:
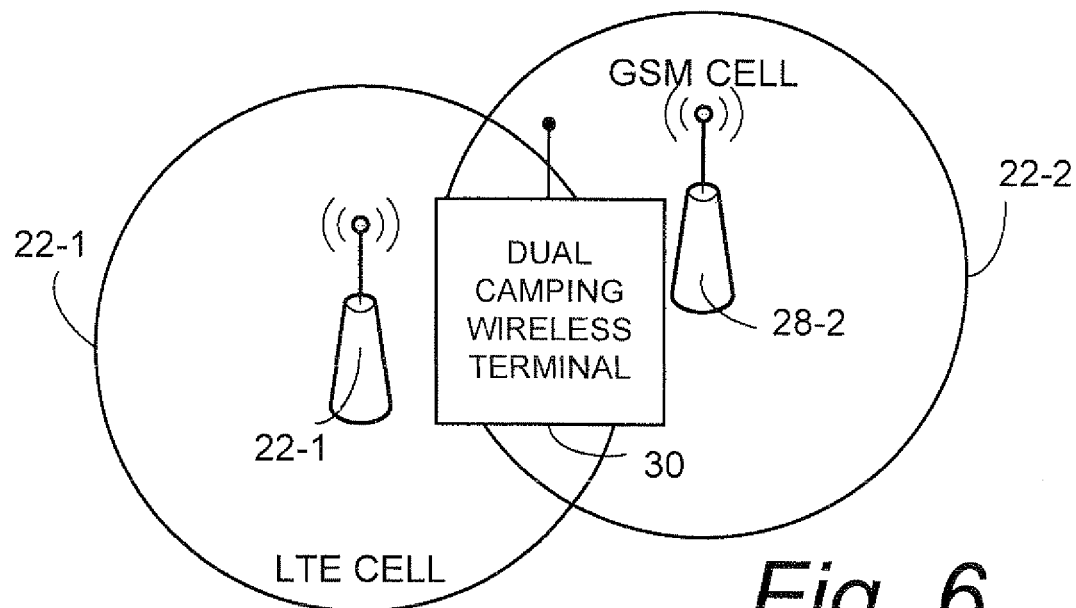
FIG. 6 is a diagrammatic view depicting a wireless terminal camping in parallel on a cell of a LTE network and a cell of a 2G (e.g., GSM) network.
Figure 7:
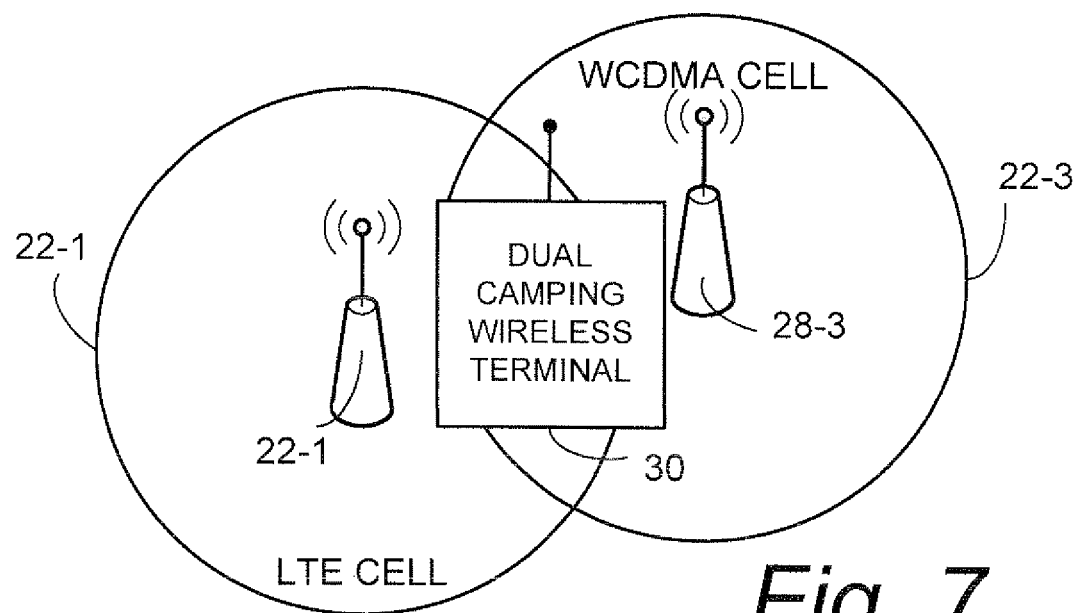
FIG. 7 is a diagrammatic view depicting a wireless terminal camping in parallel on a cell of a LTE network and a cell of a 3G network.

In accordance with one aspect of the technology disclosed herein, when the a wireless terminal or "UE" camps on a cell of the Long Term Evolution (LTE) network it will also "camp" on another radio access technology cell, i.e., a circuit switched (CS)-compatible radio access technology cell, in parallel. For example, FIG. 6 shows a cell of GSM network 22-2 and a cell of Long Term Evolution (LTE) network 22-1. The GSM network 22-2 comprises a radio base station node 28-2 while the LTE network 22-1 comprises a base station or eNodeB 28-1. FIG. 6 further shows wireless terminal or "UE" 30 camping on a cell of the Long Term Evolution (LTE) network 22-1 and also "camping" on a GSM cell (e.g., a 2G cell) of GSM network 22-2. As another example, FIG. 7 shows a cell of Long Term Evolution (LTE) network 22-1 and a cell of WCDMA network 22-3 (a 3G network). The LTE network 22-1 comprises a base station or eNodeB 28-1 while the 3G network 22-1 comprises base station 28-3. FIG. 7 further shows wireless terminal or "UE" 30 camping on a cell of the Long Term Evolution (LTE) network 22-1 also "camping" on a WCDMA cell (e.g., a 3G cell) of network 22-3.

In view, e.g., of dual camping capabilities such as illustrated by the examples of FIG. 6 and FIG. 7, the wireless terminal as configured and/or operated as described herein also known as a dual camping wireless terminal "Camping" as used herein means that the wireless terminal has selected the "best" neighbor 2G/3G cell and it has tuned to the cell and read system information. The wireless terminal performs essentially all signaling over LTE/E-UTRAN and in addition the wireless terminal keeps measuring and reselecting 2G/3G cells in parallel. The wireless terminal will keep measuring on 2G/3G cells even if there is an active packet switched (PS) session ongoing on LTE/E-UTRAN.

Since the wireless terminal 30 knows the "best" 2G/3G neighbor cell, has the system information, and is tuned into the cell, this information can be used to shortcut the information flows and speed up the call setup of a circuit switched (CS) call on 2G/3G. Mechanisms and techniques for capitalizing upon this information and accelerating call setup are described herein. These mechanisms and techniques can decrease the call setup delay both in the existing CS fallback solution [3GPP TS 23.272] as well as in the CSFB based architecture for interleaving GSM voice in LTE (such as that described in PCT/SE2007/000358).

Figure 8:
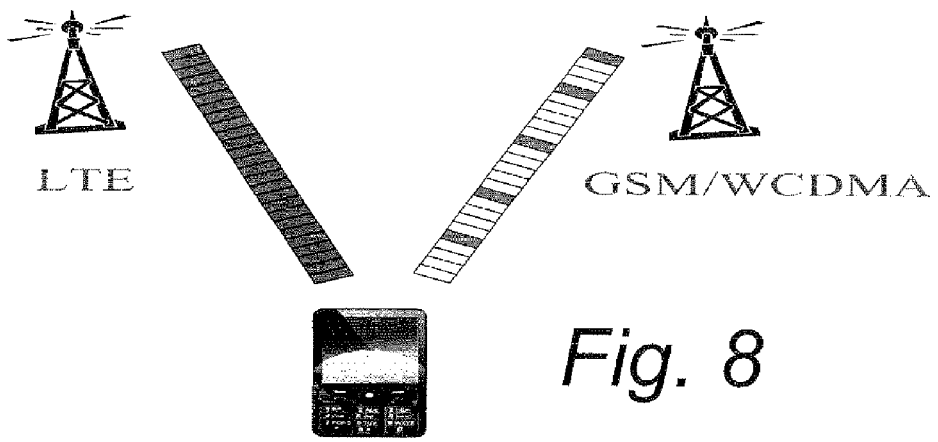
FIG. 8 is a diagrammatic view depicting positioning of a dual receiver wireless terminal relative to a first radio access technology network and a second radio access technology network.

As used herein, the dual camping wireless terminal can be either of two basic types. A first basic type of dual camping wireless terminal is a wireless terminal that has a dual receiver and thus can simultaneously receive transmissions from two different radio access technology networks. This first basic type of dual camping wireless terminal is shown in FIG. 8 wherein dual receiver wireless terminal is shown listening to both LTE and 2G (or 3G) at the same time. This allows the dual camping wireless terminal to perform measurements on 2G/3G cells simultaneously with any other activity on LTE.

Figure 9:
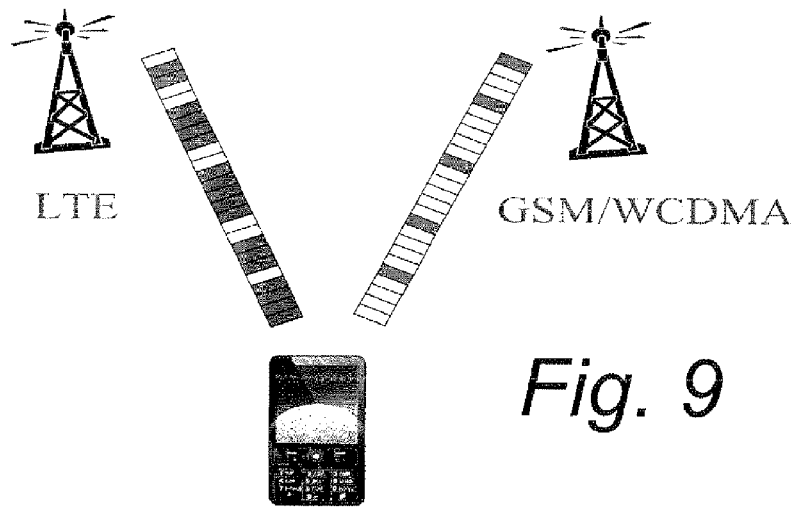
FIG. 9 is a diagrammatic view depicting positioning of an interleaving wireless terminal relative to a first radio access technology network and a second radio access technology network.

A second basic type of dual camping wireless terminal is an interleaving or multiplexing wireless terminal that is able to interleave or multiplex 2G/3G measurements and reading of system information with idle or active mode on LTE/E-UTRAN. This second basic type of dual camping wireless terminal is shown in FIG. 9 wherein interleaving wireless terminal is capable of interleaving or multiplexing 2G/3G measurements during some time slots and the reading of system information with idle or active mode on LTE/E-UTRAN during other time slots. This second type of dual camping wireless terminal requires that the wireless terminal and LTE/E-UTRAN be able to create "gaps" in LTE in which the wireless terminal can measure on 2G/3G and read system information. This is already made possible to allow for normal LTE operation; the difference is that this type of dual camping wireless terminal requires continuous patterns of gaps in LTE in order to perform the measurements and reading of system information on 2G/3G.

Thus, both the dual receiver wireless terminal and the interleaving wireless terminal can "camp" on LTE and a 2G/3G cell in parallel. The interleaving wireless terminal needs to inform the LTE/E-UTRAN of the wireless terminal's capability in order for the eNodeB to create the necessary scheduling pattern of gaps for neighbor cell measurements. Due to mobility there may also be a need to time adjust the occurrence of the gaps.

Figure 10:
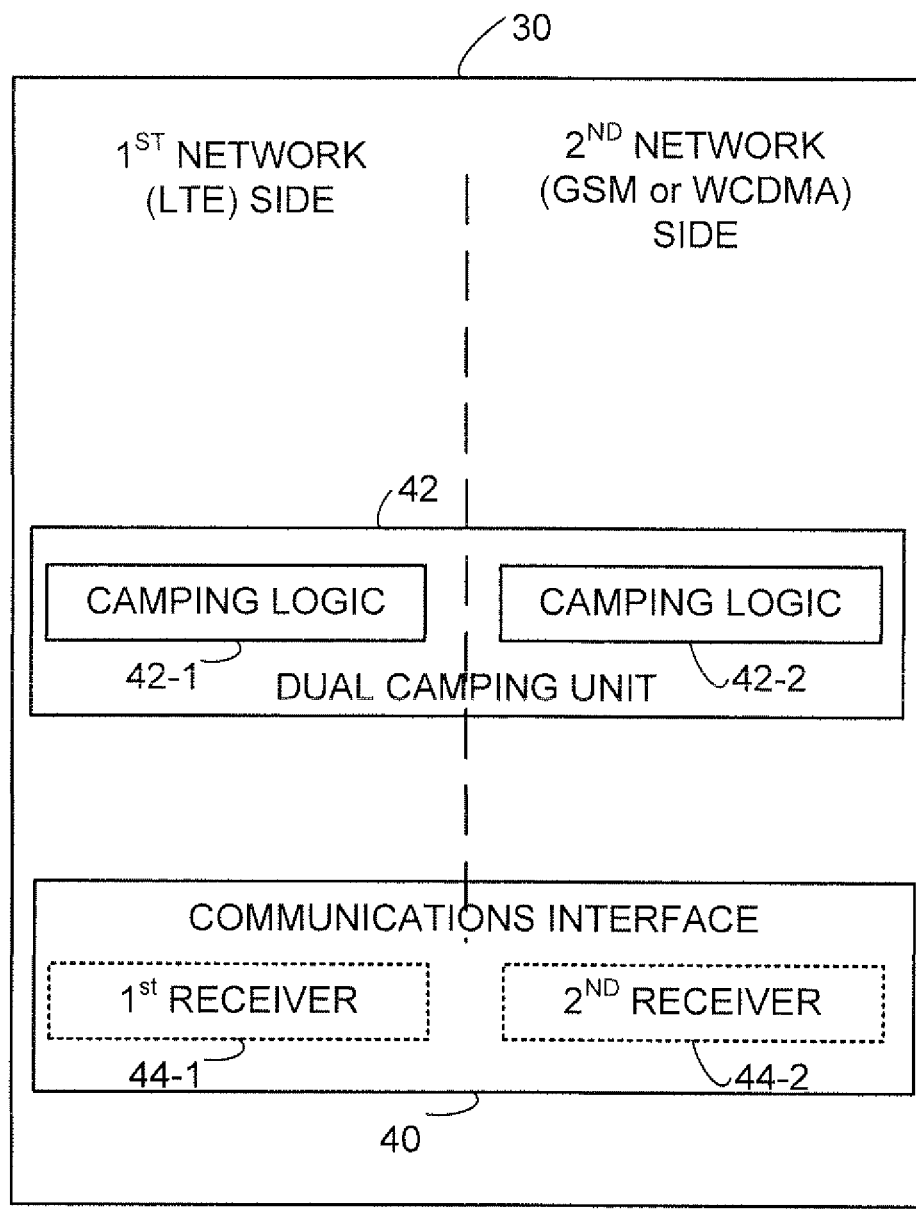
FIG. 10 is a schematic view of an example embodiment of a generic dual camping wireless terminal.

FIG. 10 shows an example embodiment of a generic dual camping wireless terminal 30. Since it is dual camping, in terms of functionalities the wireless terminal 30 can be conceptualized as having both a first network side and a second network side, and thus is illustrated in FIG. 10 as having a broken network functionality demarcation line. In terms of units which are fundamental to the technology disclosed herein the wireless terminal 30 comprises communications interface 40 and dual camping unit 42. The communications interface 40 enables the wireless terminal to communicate over a radio interface with a first radio access technology network (e.g., the LTE network 22-1 of FIG. 6 and FIG. 7) and with a second radio access technology network (e.g., the GSM network 22-2 of FIG. 6 or the WCDMA network 22-3 of FIG. 7).

The dual camping unit 42 is configured to tune both to a selected cell for the first network (e.g., the LTE network 22-1 of FIG. 6 and FIG. 7) and the selected cell for the second network (e.g., the GSM network 22-2 of FIG. 6 or the WCDMA network 22-3 of FIG. 7), and to do so prior to the wireless terminal making a request to participate in a circuit switched call with the second network. To this end the dual camping unit 42 is illustrated as being partitioned into or otherwise comprising dual camping unit first subsection 42-1 and dual camping unit second subsection 42-2. The dual camping unit first subsection 42-1 is responsible for tuning to the first network 22-1 while the dual camping unit second subsection 42-2 is responsible for tuning to the first network 22-2.

As used herein, a "request to participate" in a circuit switched call comprises either a request to establish the circuit switched call or a response to a page for the circuit switched call.

In one example embodiment the communications interface 40 is configured to listen to both the first network and the second network at a same time, so that measurements can be performed on cells of the second network simultaneous with activity toward the first network. In such example embodiment the wireless terminal is a dual receiver wireless terminal as described with reference to FIG. 8. In another example embodiment the communications interface 40 is configured to facilitate the measurement unit performing measurements on cells of the second network in gaps of transmissions with the first network (e.g., the LTE network). In such other example embodiment the wireless terminal is an interleaving or multiplexing wireless terminal as described with reference to FIG. 9. Although FIG. 10 generically describes dual camping wireless terminals of both the dual receiver and interleaving types, for sake of illustration FIG. 10 shows by broken lines the dual receivers 44-1 and 44-2 of communications interface 40 for the dual receiver type of dual camping wireless terminal. It should be appreciated that, unless otherwise specified, other embodiments of wireless terminals described and/or illustrated can be either dual receiver type wireless terminals or interleaving type wireless terminals.

Figure 11:
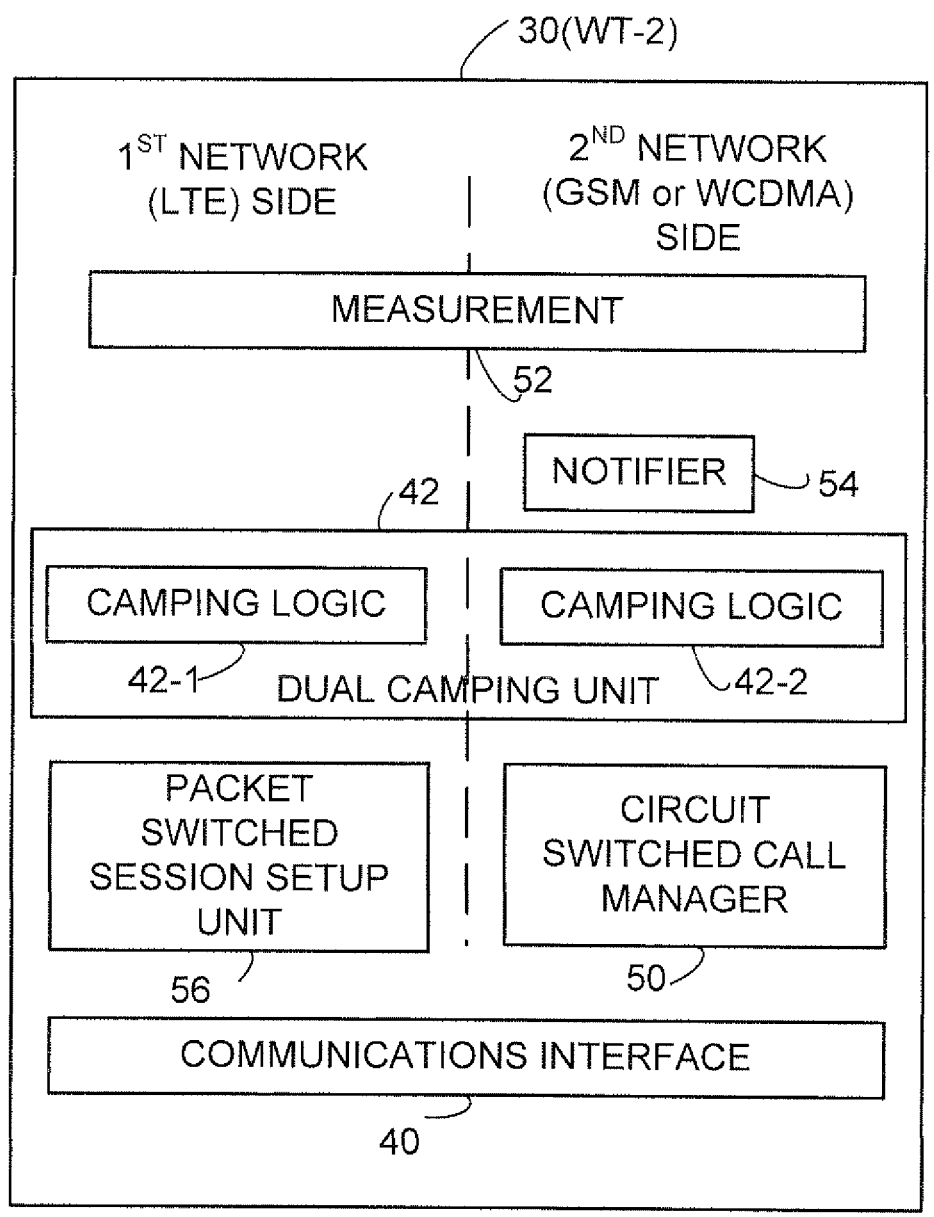
FIG. 11 is a more detailed schematic view of an example embodiment of a dual camping wireless terminal.

FIG. 11 shows more details of an example embodiment of a dual camping wireless terminal 30(11). In addition to communications interface 40 and dual camping unit 42, the wireless terminal 30(11) of FIG. 11 comprises circuit switched call manager 50; measurement unit 52; dual camping notifier 54; and packet switched session manager 56. The circuit switched call manager 50 is configured to request to participate in a circuit switched call by generating either a request to establish a circuit switched call which is to be originated by wireless terminal 30 or a response to a page for a circuit switched call which is to be terminated by wireless terminal 30. The dual camping notifier 54 generates a notification message arranged to notify a mobility management entity (MME) that the wireless terminal is capable of camping on both a cell of the first network and a cell of the second network. The packet switched session manager 556 maintains and/or starts a packet switched session with the first network by interleaving transmissions of the circuit switched call and a packet switched session after the actual establishment of the circuit switched call with the second network.

Figure 12:
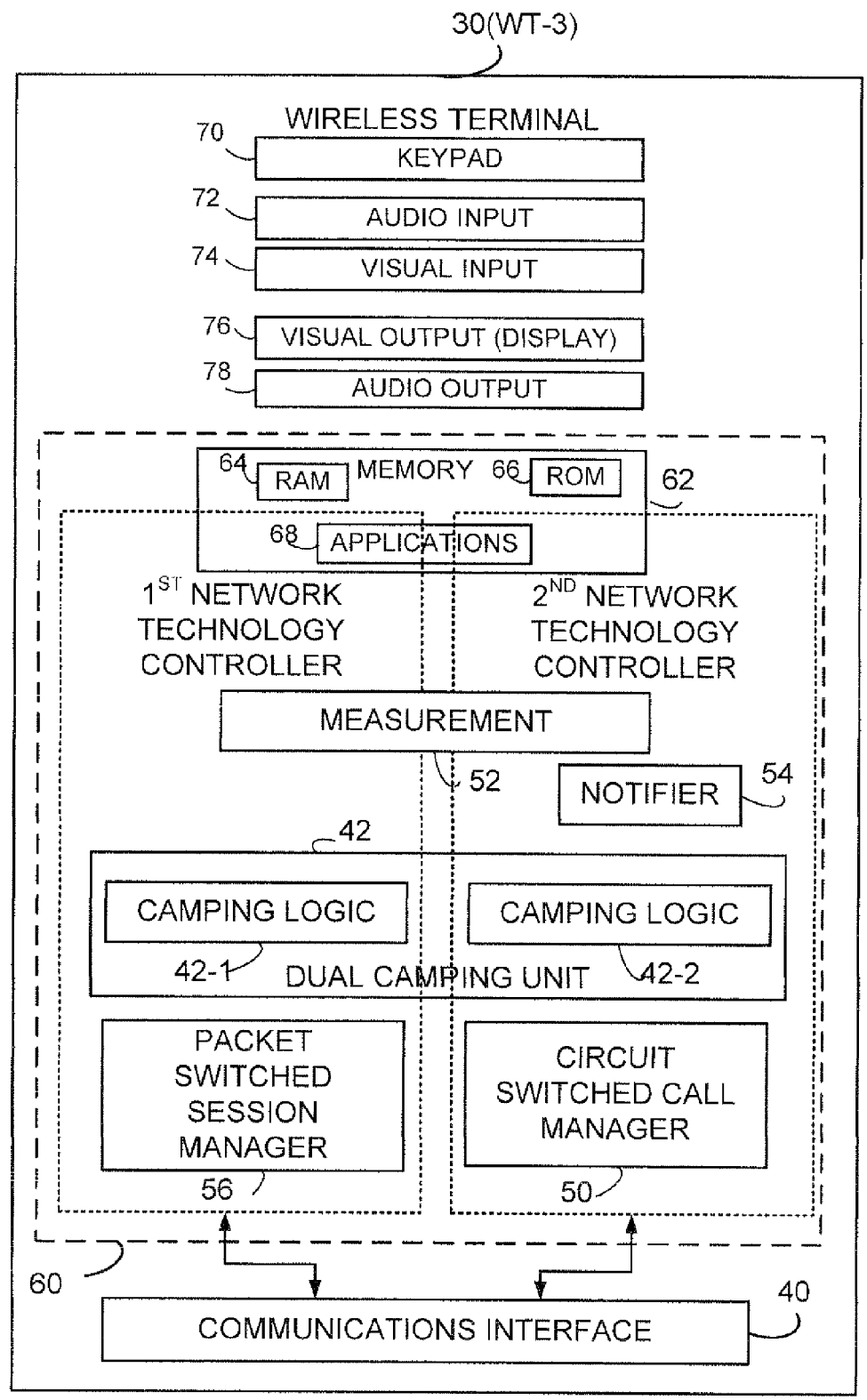
FIG. 12 is a more detailed schematic view of an example embodiment of a dual camping wireless terminal showing a platform implementation.

FIG. 12 shows an example embodiment of a dual camping wireless terminal 30(12) comprising a first controller 58-1 configured to handle administration and transmissions of LTE network 22-1 and second controller 58-2 configured to handle administration and transmissions of network 22-2 or network 22-3. First controller 58-1 and second controller 58-2 can be realized or implemented by a same processor or controller (or processor system), and in such case may constitute separate sets of non-transitory executable signals (e.g., programs or routines stored on tangible media).

FIG. 12 further shows that certain functionalities of the example embodiment dual camping wireless terminal 30(12) can be realized by and/or provided on a platform 60. The terminology "platform" is a way of describing how the functional units of a communications unit or node can be implemented or realized by machine One example platform is a computer implementation wherein one or more of the elements framed by line 60, including but not limited to dual camping unit 42, circuit switched call manager 50, measurement unit 52, dual camping notifier 54, and packet switched session manager 56.

In one example implementation, these functionalities shown as framed by platform 60 and even other functionalities can be realized by one or more processors which execute coded instructions stored in memory (e.g., non-transitory signals) in order to perform the various acts described herein. In such a computer implementation the wireless terminal can comprise, in addition to a processor(s), a memory section 62 (which in turn can comprise random access memory 64; read only memory 66; application memory 68 (which stores, e.g., coded instructions which can be executed by the processor to perform acts described herein); and any other memory such as cache memory, for example).

Whether or not specifically illustrated, typically the wireless terminal of each of the embodiments discussed herein can also comprise certain input/output units or functionalities, the representative input/output units for wireless terminal being illustrated in FIG. 12 as keypad 70; audio input device (e.g. microphone) 72; visual input device (e.g., camera) 74; visual output device (e.g., display 76); and audio output device (e.g., speaker) 78. Other types of input/output devices can also be connected to or comprise wireless terminal 30.

In the example of FIG. 12 the platform 60 has been illustrated as computer-implemented or computer-based platform. Another example platform 60 for wireless terminal can be that of a hardware circuit, e.g., an application specific integrated circuit (ASIC) wherein circuit elements are structured and operated to perform the various acts described herein.

Furthermore, it will be appreciated that, as used herein, "wireless terminal(s)" or "UE" can be mobile stations or user equipment units (UE) such as but not limited to mobile telephones ("cellular" telephones) and laptops with wireless capability), e.g., mobile termination, and thus can be, for example, portable, pocket, hand-held, computer-included, or car-mounted mobile devices which communicate voice and/or data with radio access network.

Figure 13:
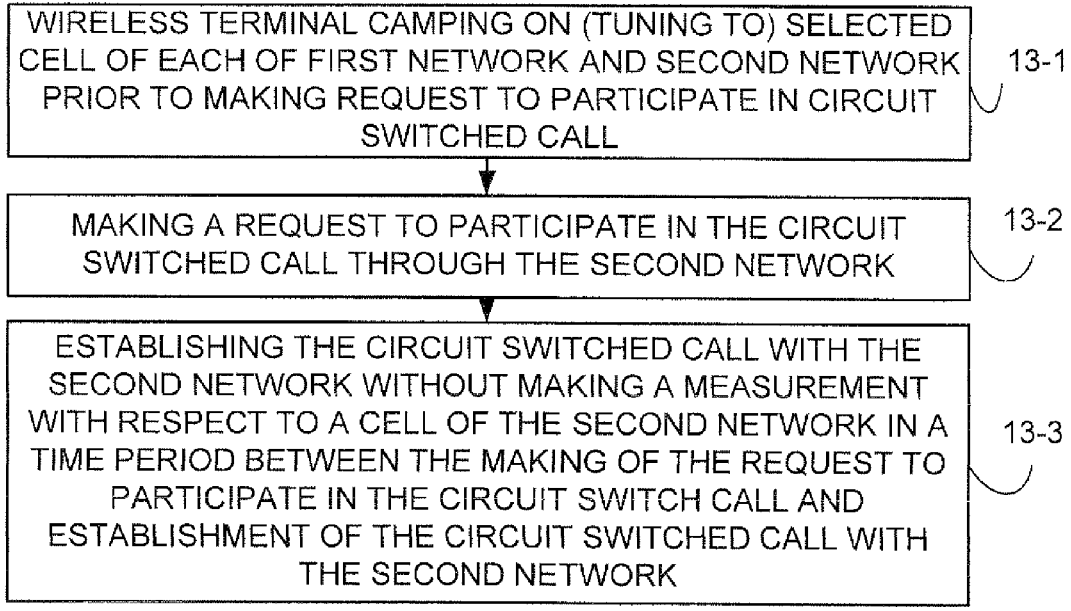
FIG. 13 is a flowchart illustrates basic, representative acts or steps involved in a method of operating a generic dual camping wireless terminal.

FIG. 13 illustrates basic, representative acts or steps involved in a method of operating a generic dual camping wireless terminal. Act 13-1 comprises the wireless terminal (prior to making a request to participate in a circuit switched call with the second network) camping on a respective selected cell of each of the first network and the second network. In camping on the respective selected cells the wireless terminal has essentially tuned to both the selected cell for the first network and the selected cell for the second network. Act 13-2 comprises the wireless terminal making a request to participate in the circuit switched call through the second network. Act 13-3 comprises the wireless terminal, in view of already camping on the selected cell of the second network, establishing the circuit switched call with the second network without making a measurement with respect to a cell of the second network in a time period between the making of the request to participate in the circuit switch call and establishment of the circuit switched call with the second network.

Figure 14:
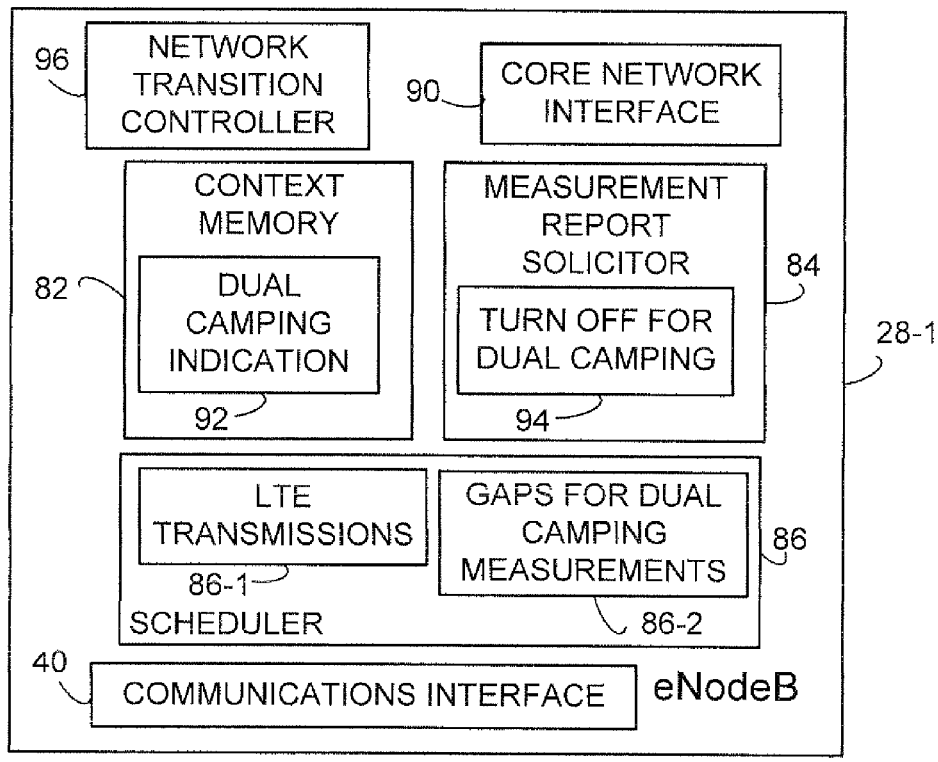
FIG. 14 is a schematic view of a base station node according to an example embodiment.

FIG. 14 illustrates an example embodiment of a base station node 28-1 of a Long Term Evolution (LTE) network which serves a dual camping wireless terminal 30. The base station 28-1 comprises base station communication interface 80; context memory 82; measurement report solicitor 84; base station scheduler 86; and core network interface 90. The base station communication interface 80 is configured to facilitate transmissions over the air or radio interface with wireless terminal 30. Such transmissions are scheduled and controlled by base station scheduler 86.

The context memory 82 receives and stores the indication 92 that the wireless terminal is capable of camping on both a cell of the first network and a cell of the second network (from which the base station 28 thereby understands that the wireless terminal is thereby capable of tuning to both a selected cell for the first network and a selected cell for the second network). The measurement report solicitor 84 is configured to refrain from requesting that the wireless terminal 30 for which the indication 92 is stored perform the measurement with respect to the cell of the second network in a time period between the receipt of the request to participate in the circuit switch call and actual establishment of the circuit switched call with the second network. FIG. 14 shows as logic or unit 94 of measurement report solicitor 84 that turns off the measurement report in a post-call request/pre-call establishment interval.

In an example embodiment the base station scheduler 86 is configured to schedule communications between the first network and the wireless terminal in a manner to allow the wireless terminal to perform measurements with respect to cells of the second network in interleaved fashion with the communications between the first network and the wireless terminal To this end base station scheduler 86 comprises an LTE scheduler section 86-1 and a second network (e.g. GSM or WCDMA) scheduler section 86-2.

In an example embodiment the base station node further comprises a network transition controller 96. The network transition controller 96 can take the form of at least one of a Radio Resource Control (RRC) connection controller; a cell change order controller; and a packet switch handover controller. The Radio Resource Control (RRC) connection controller is configured to perform a release Radio Resource Control (RRC) connection procedure prior to the actual establishment of the circuit switched call with the second network. The cell change order controller is configured to perform a cell change order prior to the actual establishment of the circuit switched call with the second network. The packet switch handover controller is configured to perform a packet switch handover procedure prior to the actual establishment of the circuit switched call with the second network.

In an example embodiment the base station scheduler 86 of the base station node further is configured to authorize the wireless terminal to establish the circuit switched call with the second network and thereafter maintain and/or start a packet switched session between the wireless terminal and the first network by interleaving transmissions of the circuit switched call and the packet switched session.

Figure 15:
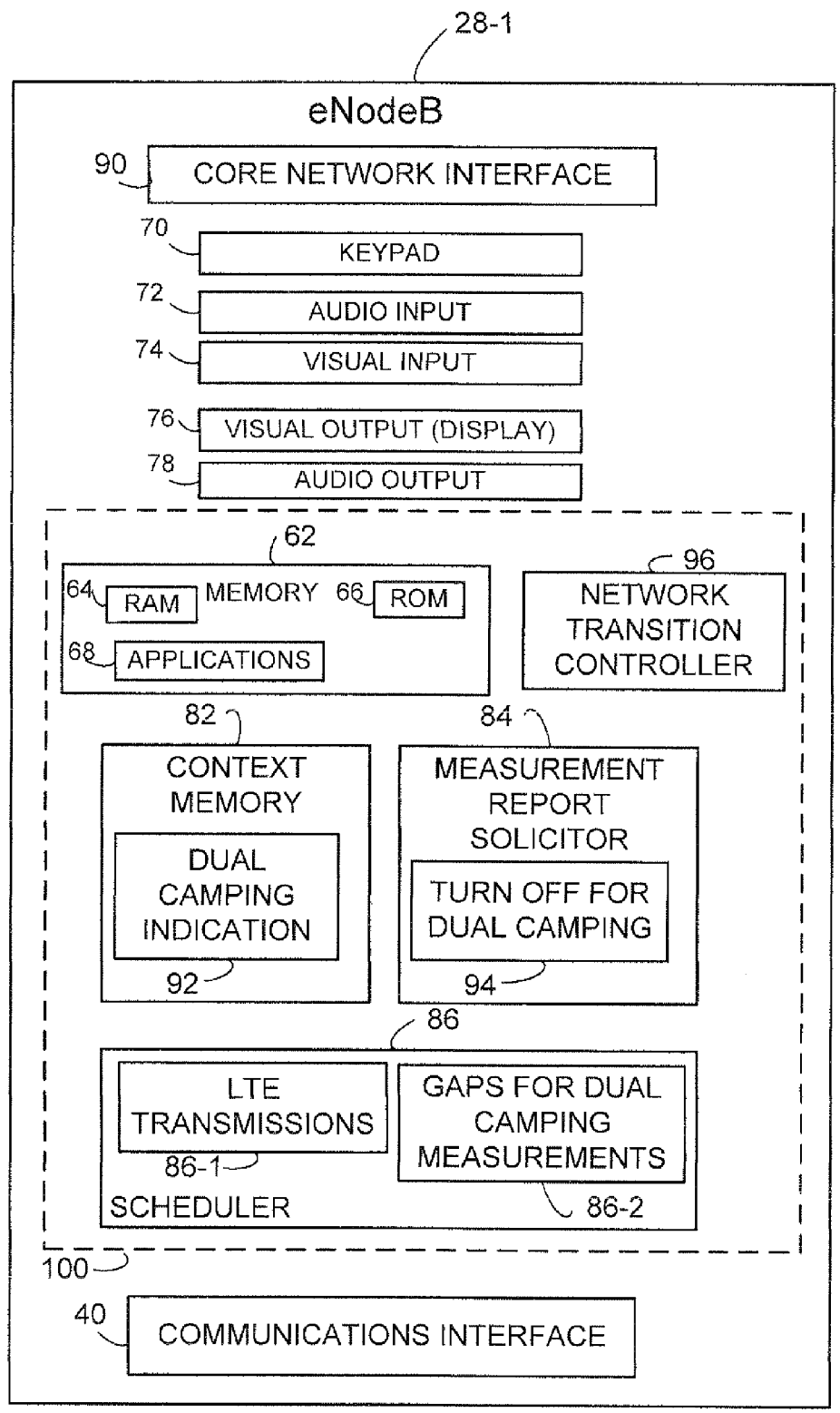
FIG. 15 is a more detailed schematic view of a generic base station node according to an example embodiment showing a platform implementation.

FIG. 15 shows that certain functionalities of the example embodiment base station 28-1 can be realized by and/or provided on a platform 100. One example platform is a computer implementation wherein one or more of the elements framed by line 100, including but not limited to context memory 82, measurement report solicitor 84, base station scheduler 86, and network transition controller 96.

In one example implementation, these functionalities shown as framed by platform 100 and even other functionalities can be realized by one or more processors which execute coded instructions stored in memory (e.g., non-transitory signals) in order to perform the various acts described herein. In such a computer implementation the base station node can comprise, in addition to a processor(s), a memory section 102 (which in turn can comprise random access memory 104; read only memory 106; application memory 108 (which stores, e.g., coded instructions which can be executed by the processor to perform acts described herein); and any other memory such as cache memory, for example). The base station 28-1 of each of the embodiments discussed herein can also comprise certain input/output units or functionalities such as previously discussed for the wireless terminal.

In the example of FIG. 15 the platform 100 has been illustrated as computer-implemented or computer-based platform. Another example platform 100 for 28-1 can be that of a hardware circuit, e.g., an application specific integrated circuit (ASIC) wherein circuit elements are structured and operated to perform the various acts described herein.

Figure 16:
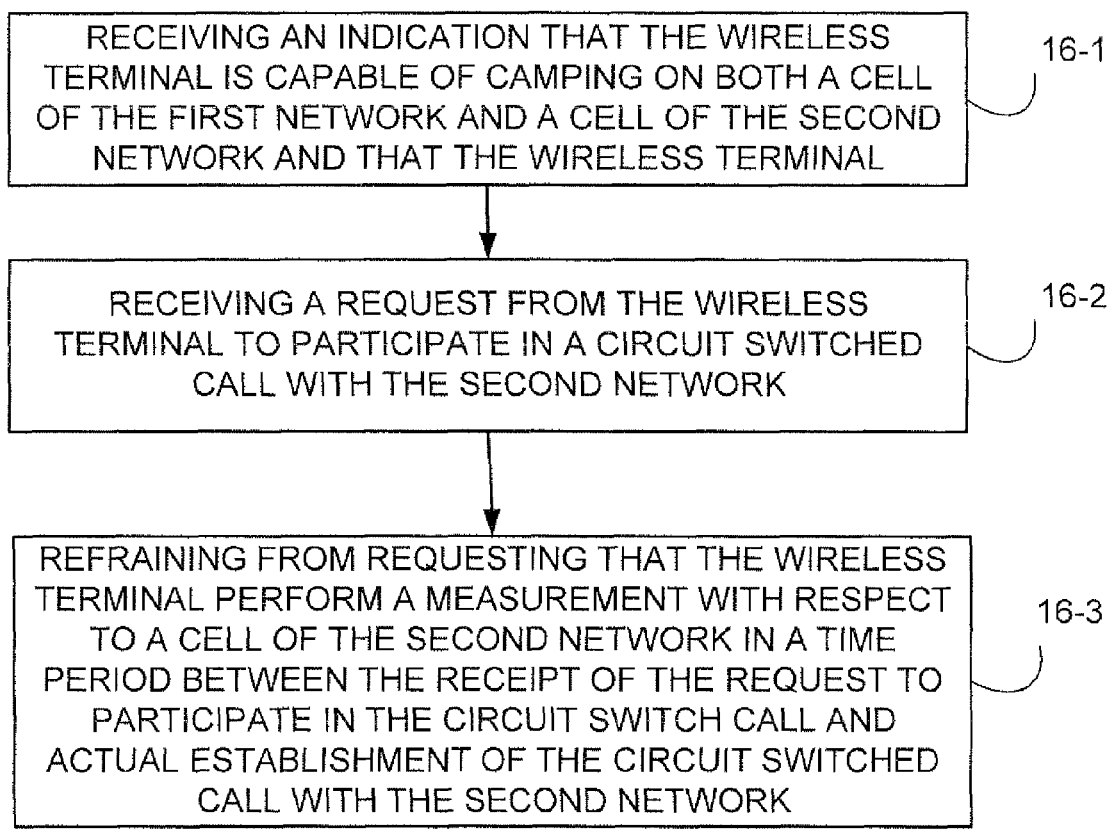
FIG. 16 is a flowchart illustrates basic, representative acts or steps involved in a method of operating a base station node which serves a dual camping wireless terminal.

FIG. 16 illustrates basic, representative acts or steps involved in a method of operating a base station node 28-1 which serves a generic dual camping wireless terminal. Act 16-1 comprises base station node 28-1 receiving an indication that the wireless terminal is capable of camping on both a cell of the first network and a cell of the second network (and therefore that the wireless terminal is capable of tuning to both a selected cell for the first network and a selected cell for the second network). Act 16-2 comprises the base station node 28-1 receiving a request from the wireless terminal to participate in a circuit switched call with the second network. Act 16-3 comprises in response to the indication the wireless terminal is capable of camping on both a cell of the first network and a cell of the second network, refraining from requesting that the wireless terminal perform a measurement with respect to a cell of the second network in a time period between the receipt of the request to participate in the circuit switch call and actual establishment of the circuit switched call with the second network.

As understood from the foregoing, to benefit from the dual camping capability, a few modifications of the circuit switched fallback (CSFB)) mechanisms and information flows are needed to optimize/reduce the call setup delay. One modification is that the wireless terminal shall inform the eNodeB of its dual camping capability and whether the wireless terminal is a dual receiver wireless terminal or an interleaving wireless terminal. Such notification can be generated by the dual camping notifier 54 and transmitted by communications interface 40 from the wireless terminal 30 to the eNodeB 28-1 of the LTE network 22-1 and stored as indication 92 in context memory 82. These capabilities can be added as new information in the wireless terminal radio capabilities that are already signaled to the eNodeB in existing message flows. In active mode and the eNodeB 28-1 uses the knowledge of the capability information to determine which information which type of handover (HO) to execute and to ensure that the wireless terminal is provided with 2G/3G neighbor cell information. If the wireless terminal is an interleaving wireless terminal the eNodeB will also use the capability information to schedule potential PS traffic on LTE/E-UTRAN in a pattern that allows the interleaving wt to continue to measure on 2G and 3G neighbor cells.

Figure 17:
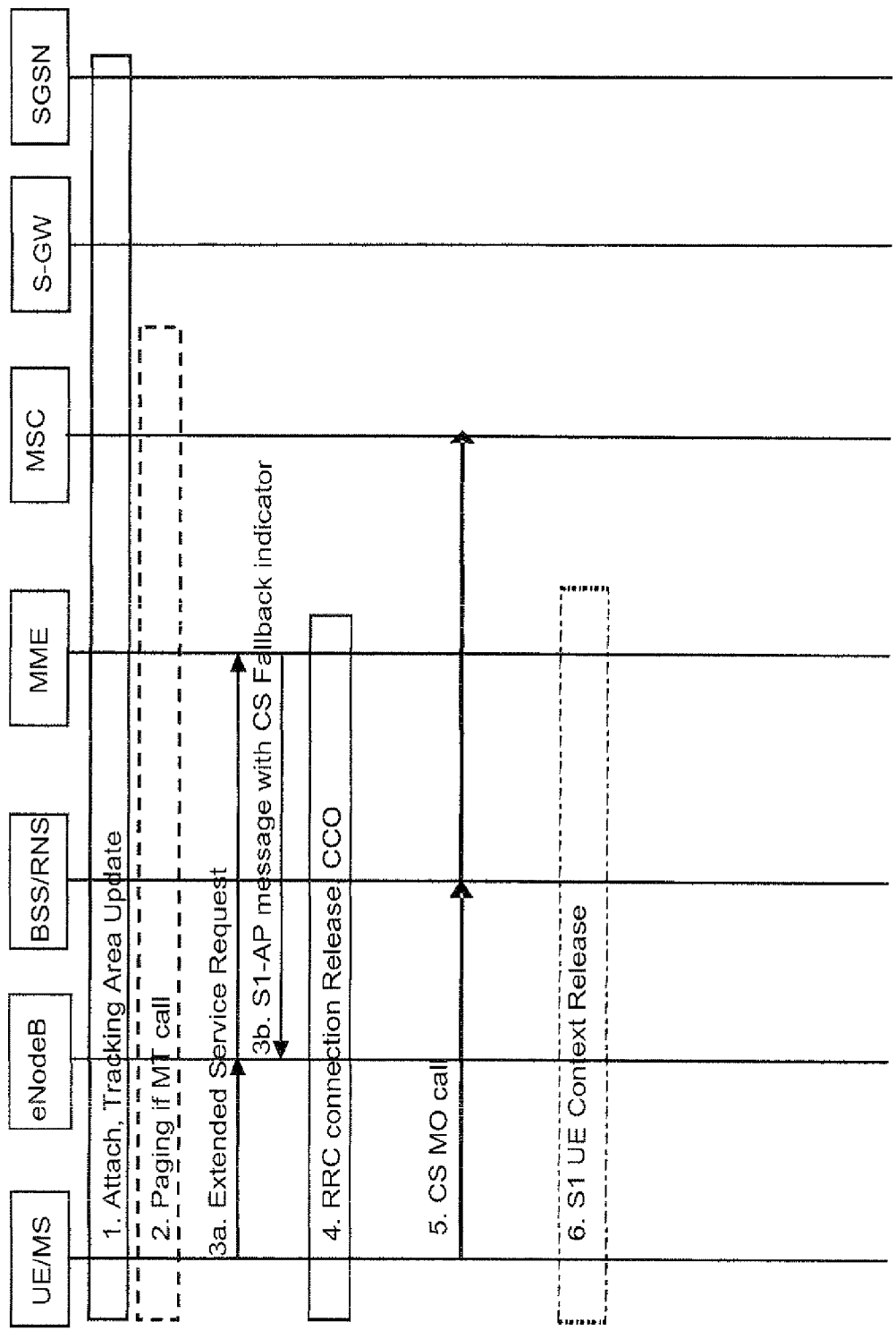
FIG. 17 is a diagrammatic view illustrating example acts, steps, or events involved in enhanced CS fallback flow for a wireless terminal in idle mode.

FIG. 17 illustrates example acts, steps, or events involved in enhanced CS fallback flow for a wireless terminal in idle mode. Various acts of FIG. 17 are discussed below. As act 1 of FIG. 17, the wireless terminal performs an attach procedure or a tracking area update (TAU) procedure on LTE. In this act the UE capabilities (dual camping) are transferred to the mobility management entity (MME) which keeps the information in the UE context. In idle mode the wireless terminal will camp on LTE and 2G (or 3G) in parallel. When in idle mode the UE selects suitable cells to camp on based on signal strength measurements and cell selection parameters provided by the network.

For terminating calls in idle mode, as act 2 of FIG. 17 the mobile switching center (MSC) sends a paging message to the mobility management entity (MME) over the serving gateway's (SGs) interface and the MME forwards the page to the wireless terminal indicating that the MME is paging for a CS call.

As act 3*a* of FIG. 17 the wireless terminal sends an extended service request (indicating that it wants to establish a circuit switched (CS) call). As act 3*b* of FIG. 17 the MME sends a S1-AP message to the eNodeB to indicate that a circuit switched fallback (CSFB) is to occur and establishes the UE context in the eNodeB. In this act the UE capabilities is transferred to the eNodeB.

Since the wireless terminal was in idle mode and the eNodeB knows the UE capabilities, the eNodeB knows it can determine that there is no need to request measurements (the wireless terminal already knows a suitable 2G or 3G cell). The eNodeB and particularly the network transition controller 96 can hence determine to use the simplest possible network transition or handover mechanism, e.g., RRC connection release or Cell Change Order (CCO) as depicted by act 4 of FIG. 17. The RRC connection release or Cell Change Order (CCO) permit the wireless terminal to establish the circuit switched (CS) called. By leaving the Long Term Evolution (LTE) in a controlled way the wireless terminal is able to initiate the circuit switched (CS) call on the new access.

At reception of the RRC Connection release or CCO as act 5 of FIG. 17 the wireless terminal uses its 2G or 3G to send a page response or to establish the call. Since it was already "camping" on a 2G or 3G cell there is no delay for measurements, tuning or reading of system information.

Any remaining resources are released on LTE/E-UTRAN as shown by act 6 of FIG. 17. If the 2G or 3G cell belongs to a different Routing Area (RA) or Location Area (LA) the wireless terminal may also need to perform routing area update (RAU) procedure and/or a location area update (LAU) procedure.

Figure 18:
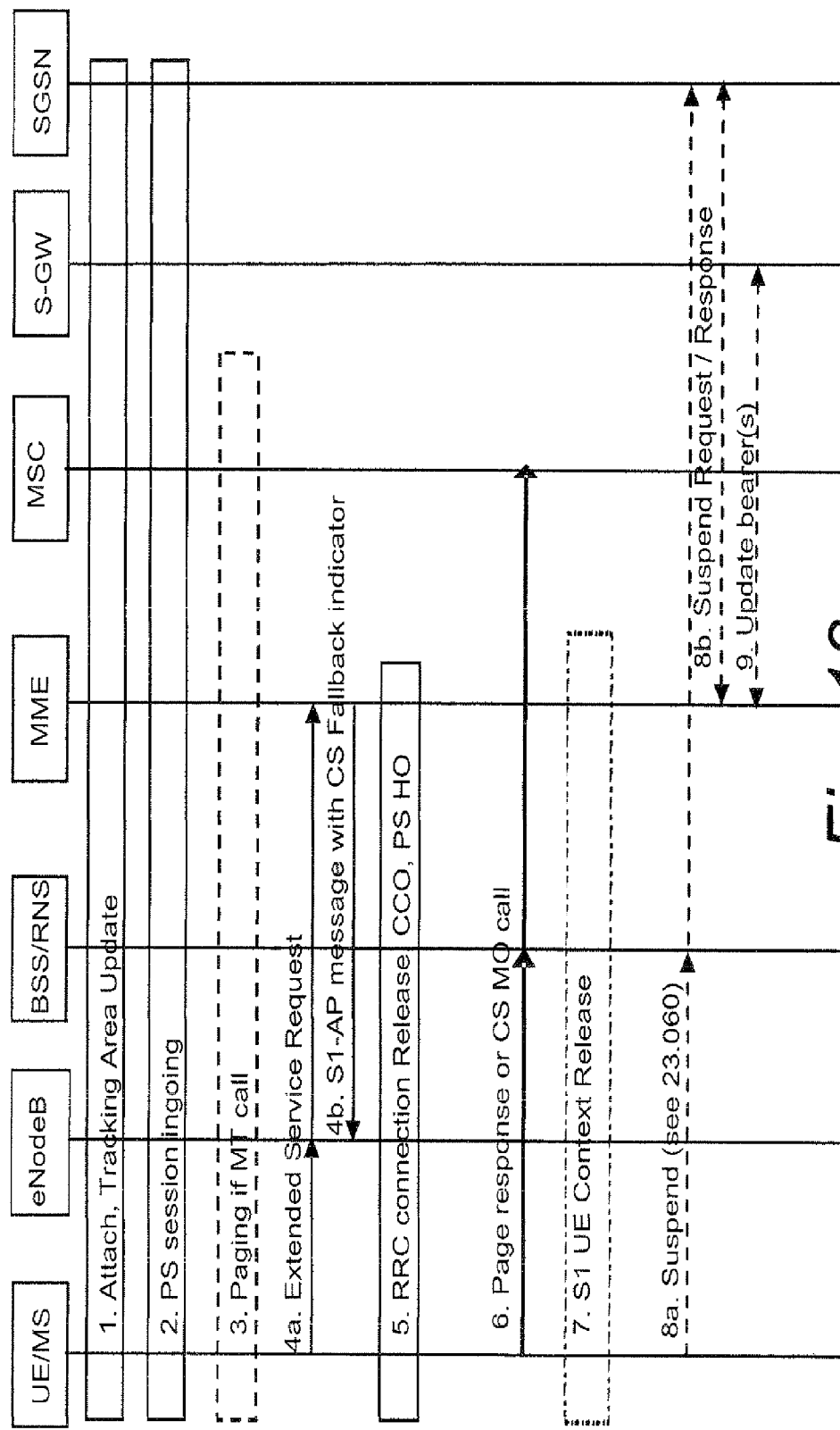
FIG. 18 is a diagrammatic view illustrating example acts, steps, or events involved in enhanced CS fallback flow for a wireless terminal with active LTE packet switched (PS) sessions.

FIG. 18 depicts enhanced circuit switched fallback (CSFB) flow for a wireless terminal with an active Long Term Evolution (LTE) packet switched session(s). Various acts of FIG. 18 are discussed below. As act 1 of FIG. 18, the wireless terminal performs an attach procedure or tracking area update (TAU) procedure on LTE. In this step the UE capabilities (dual camping) are transferred to the mobility management entity (MME) which keeps the information in the UE context. In idle mode the wireless terminal will camp on LTE and 2G (or 3G) in parallel.

As act 2 of FIG. 18 a packet switched session is established. During this act packet switched bearers will be established and the eNodeB will be provided with the UE capability information. Based on the "dual camping" UE capability the eNodeB provides the wireless terminal with neighbor cell information in order for the wireless terminal to know where it's 2G/3G radio should search for suitable cells. If the wireless terminal is an interleaving wireless terminal the eNodeB will also schedule PS traffic on the bearers to allow parallel measurements on 2G/3G cells.

For terminating calls in idle mode, as act 3 of FIG. 18 the mobile switching center (MSC) sends a paging message to the mobility management entity (MME) over the serving gateway's (SG's) interface and the mobility management entity (MME) forwards the page to the wireless terminal indicating that it is a paging for a circuit switched (CS) call.

As act 4 of FIG. 18 the wireless terminal performs sends extended service request (indicating that the wireless terminal wants to establish a circuit switched (CS) call). The mobility management entity (MME) modifies the UE context in the eNodeB.

Since the wireless terminal was in active mode and the eNodeB knows the UE capabilities, the eNodeB can use packet switched handover (HO) when supported (to minimize the PS interruption). Since the wireless terminal is already "camping" on a 2G (or 3G) cell, the eNodeB will ask for measurements and the wireless terminal replies immediately with the 2G/3G cell it's "camping" on. There is no delay for measurements (just for reporting the selected cell to the eNodeB), not any delay for tuning or reading of system information. If packet switched handover (HO) is not supported or a longer break in the packet switched session is acceptable the eNodeB may also use the RRC connection redirection or CCO mechanisms to move the WIRELESS TERMINAL to the Selected cell. See act 5 of FIG. 18. As in the ideal case there is no delay penalty for the circuit switched (CS) call establishment when using these simpler mechanisms.

At reception of the HO command, RRC Connection release or Cell Change Order (CCO) as act 6 of FIG. 18 the wireless terminal uses its 2G or 3G stack to send a page response or to establish the call.

As act 7 of FIG. 18, any remaining resources are released on LTE/E-UTRAN. If the selected cell is a 2G cell without DTM, the wireless terminal may initiate the suspend procedure (act 8*a* of FIG. 18). The wireless terminal may also need to perform a RAU and/or a LAU.

FIG. 17 and FIG. 18 have described how circuit switched fallback (CSFB) can be enhanced through modifications of the existing information flows for dual camping UEs. Similar optimizations can also be done for the circuit switched fallback (CSFB)-based "interleaving GSM voice in LTE" solution. The main difference compared to the normal CS Fallback case is that the wireless terminal can keep any ongoing packet switched sessions on LTE in parallel to a circuit switched (CS) call on 2G. The eNodeB schedules the packet switched traffic in a pattern that allows wireless terminal to send and receive Voice in the GSM TDMA structure. The wireless terminal cannot maintain simultaneous connections on both 3G/WCDMA and LTE since there is no possibility to time multiplex the radios. The wireless terminal can prioritize 2G cells when camping on LTE for packet switched sessions. If there are no suitable 2G cells the wireless terminal can either determine to camp on 3G for both circuit switched (CS) and packet switched (PS), or to camp on LTE for packet switched and perform circuit switched fallback (CSFB) when making or receiving circuit switched (CS) calls.

In order to support the procedures the wireless terminal is required to support the GSM/LTE interleaving capability and the eNodeB should be able to schedule LTE data in a pattern that allows the wireless terminal to communicate with GSM in the TDMA structure.

Figure 19:
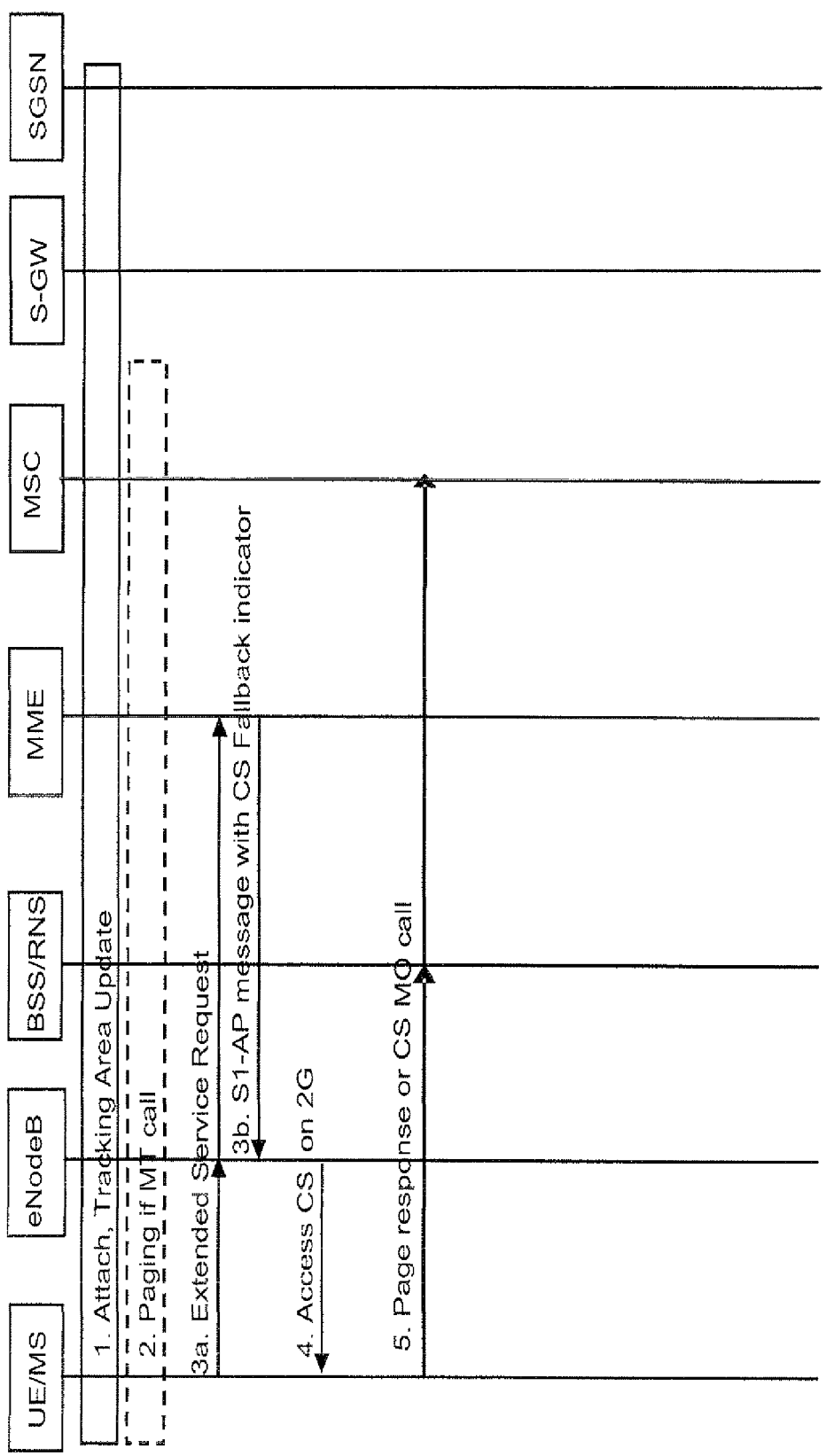
FIG. 19 is a diagrammatic view illustrating example acts, steps, or events involved in enhanced flow for an idle wireless terminal which supports parallel circuit switched (CS) on 2G and packet switched (PS) on LTE.

FIG. 19 shows enhanced flow for an idle mode wireless terminal which supports parallel circuit switched (CS) on 2G and packet switched on LTE. Various acts of FIG. 19 are discussed below.

As act 1 of FIG. 19 the wireless terminal performs an attach procedure or a TAU procedure on LTE. In this step the UE capabilities (interleaving UE) are transferred to the MME which keeps the information in the UE context. In idle mode the wireless terminal will camp on LTE and preferably 2G. If no 2G cell is available, the wireless terminal may either camp on 3G in parallel to LTE, in which case the circuit switched fallback (CSFB) procedures above apply. Otherwise the wireless terminal may camp on 3G for both CS and PS.

For terminating calls in idle mode, as act 2 of FIG. 19 the MSC sends a paging message to MME over the SGs interface and the MME forwards the page to the wireless terminal indicating that it is a paging for a CS call.

As act 3 of FIG. 19 the wireless terminal sends an extended service request (indicating that it wants to establish a CS call). The MME establishes the UE context in the eNodeB. In this step the UE capabilities is transferred to the eNodeB.

Since the wireless terminal was in idle mode and the eNodeB knows the UE capabilities, the wireless terminal can determine that there is no need to request measurements (the wireless terminal already knows a suitable 2G cell). As shown by act 4 of FIG. 10, the eNodeB can use a new message "Access CS on 2G" to instruct the wireless terminal to activate the circuit switched (CS) side on GSM.

At reception of the "access CS on 2G" message, as act 5 of FIG. 19 the wireless terminal uses its 2G radio to send a page response or to establish the call. Since it was already "camping" on a 2G cell there is no delay for measurements, tuning or reading of system information. In parallel to the CS call the wireless terminal will remain camping on Long Term Evolution (LTE) and could at any stage start a packet switched (PS) session in parallel. If so the eNodeB will schedule the traffic in a pattern that allows the wireless terminal to send and receive circuit switched (CS) voice in the GSM TDMA structure.

Figure 20:
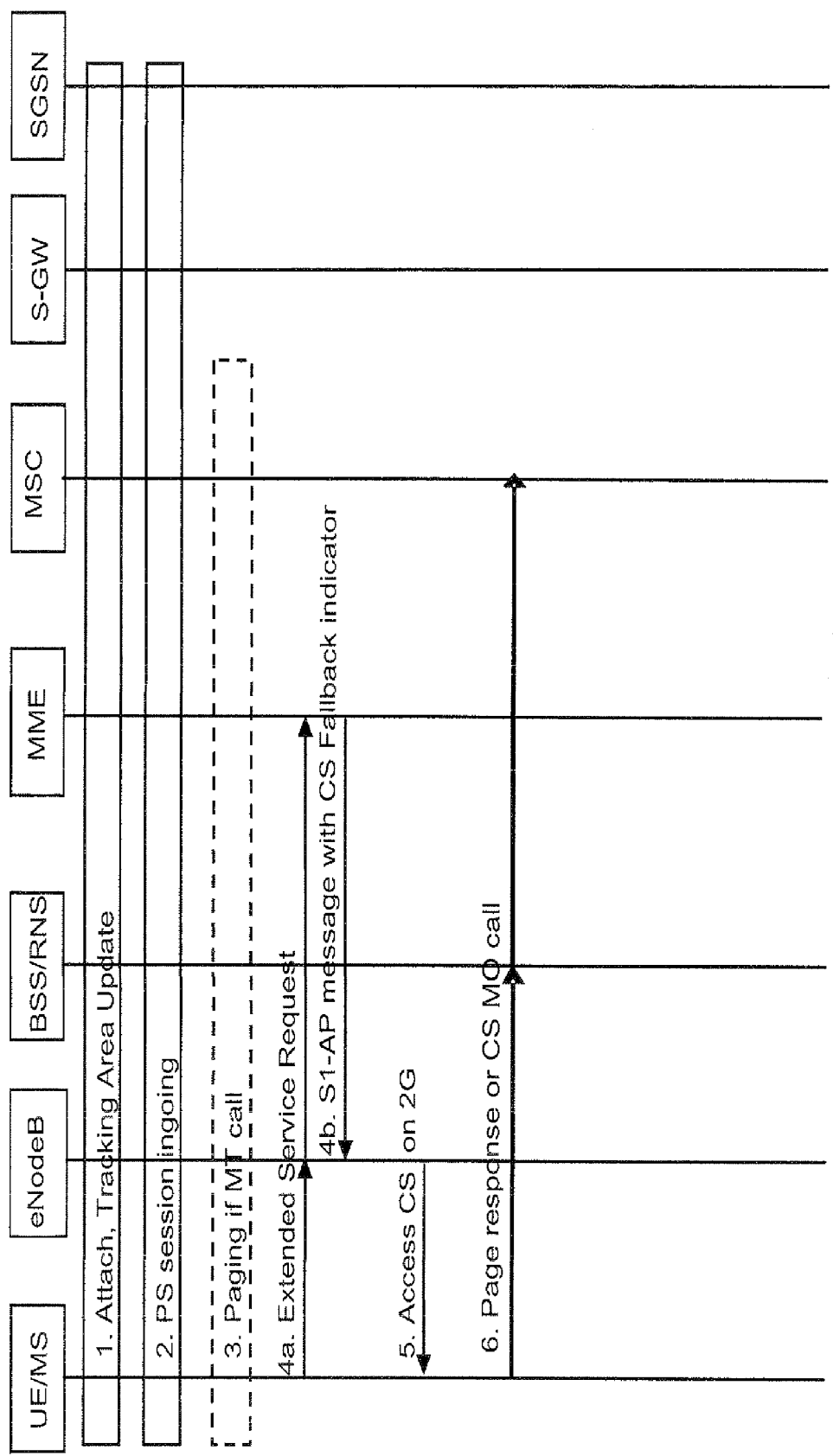
FIG. 20 is a diagrammatic view illustrating example acts, steps, or events involved in enhanced flow for an active wireless terminal which supports parallel circuit switched (CS) on 2G and packet switched (PS) on LTE.

FIG. 20 shows enhanced flow for an active wireless terminal which supports parallel circuit switched (CS) on 2G and PS on LTE. Various acts of FIG. 20 are discussed below.

As act 1 of FIG. 20, the wireless terminal performs an attach procedure or a TAU procedure on Long Term Evolution (LTE). In this step the UE capabilities (interleaving UE) are transferred to the MME which keeps the information in the UE context. In idle mode the wireless terminal will camp on LTE and preferably 2G. If no 2G cell is available, the wireless terminal may either camp on 3G in parallel to LTE, in which case the CSFB procedures above apply. Otherwise the wireless terminal may camp on 3G for both circuit switched (CS) and packet switched (PS).

As act 1 of FIG. 20 a packet switched (PS) session is established. During this step packet switched (PS) bearers will be established and the eNodeB will be provided with the UE capability information. Based on the "interleaving" UE capability the eNodeB will provide the wireless terminal with neighbor cell information in order for the wireless terminal to know where it's 2G radio should search for suitable cells. The eNodeB will schedule PS traffic on the bearers to allow parallel measurements on 2G cells.

For terminating calls in idle mode, as act 3 of FIG. 20 the mobile switching center (MSC) sends a paging message to the mobility management entity (MME) over the SGs interface and the MME forwards the page to the wireless terminal indicating that it is a paging for a circuit switched (CS) call.

As act 4 of FIG. 20 the wireless terminal performs sends extended service request (indicating that it wants to establish a circuit switched (CS) call). The MME modifies the UE context in the eNodeB.

Since the wireless terminal was in active mode and the eNodeB knows the UE capabilities, as act 5 of FIG. 20 the eNodeB can use a new message "Access CS on 2G" to instruct the wireless terminal to activate the circuit switched (CS) side on GSM. There is no delay for measurements, tuning or reading of system information.

At reception of "Access CS on 2G" and as act 6 of FIG. 20 the wireless terminal uses its 2G stack to send a page response or service request in order to establish the call. In parallel to the circuit switched (CS) call the wireless terminal keeps the packet switched (PS) sessions on LTE. The eNodeB will schedule the traffic in a pattern that allows the wireless terminal to send and to receive circuit switched (CS) voice in the GSM TDMA structure.

The improvements proposed herein can also be used to improve circuit switched (CS) fallback [3GPP TS 23.272] call setup times.

The functions, events, steps, or acts described above may be implemented by units included in network nodes or other devices, which can be computer-implement or preformed by a processor or controller as those terms are herein expansively defined.

The technology disclosed herein pertains to optimizing the CS Call establishment for wireless terminals (user equipment units (UEs)) that are "dual camping capable". These optimizations are similar for both the normal CS fallback (3GPP TS 23.272) and the GSM/LTE interleaving solution (where the wireless terminal can use both LTE for data and GSM for Voice).

As the technology disclosed herein builds on the assumption that the CSFB architecture and principles are used, the problems and solutions are common for the existing CS fallback solution as well as the CSFB based architecture for "interleaving GSM voice in LTE".

There are numerous advantages of the technology disclosed herein. For example, the technology disclosed herein facilitates decreased CS call setup delays for CS fallback user equipment units (UEs), as well as decreased CS call setup delays for GSM/LTE interleaving user equipment units (UEs) when the CS fallback architecture principles are used for the CN solution.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a wireless terminal capable of communicating with a first network and a second network, the first network being a Long Term Evolution (LTE) network, the method comprising:
    prior to making a request to participate in a circuit switched call with the second network, the wireless terminal camping on a respective selected cell of each of the first network and the second network and thereby having tuned to both the selected cell for the first network and the selected cell for the second network;
    making a request to participate in the circuit switched call through the second network;
    in view of already camping on the selected cell of the second network, establishing the circuit switched call with the second network without making a measurement with respect to a cell of the second network in a time period between the making of the request to participate in the circuit switch call and establishment of the circuit switched call with the second network; and
    in conjunction with the camping, the wireless terminal performing measurements on cells of the second network in gaps of transmissions with the first network.

2. The method of claim 1, wherein the request to participate in a circuit switched call comprises either a request to establish the circuit switched call or a response to a page for the circuit switched call.

3. The method of claim 1, wherein in camping on the selected cell for the second network the wireless terminal has determined the selected cell of the second network to be a best cell of the second network for the wireless terminal and has acquired system information of the second network.

4. The method of claim 1, further comprising, in conjunction with the camping, the wireless terminal listening to both the first network and the second network at a same time and thereby performing measurements on cells of the second network simultaneous with activity toward the first network.

5. The method of claim 1, further comprising the wireless terminal notifying a mobility management entity (MME) that the wireless terminal is capable of camping on both a cell of the first network and a cell of the second network.

6. The method of claim 1, further comprising the wireless terminal performing a Radio Resource Control (RRC) connection release and/or cell change order and/or a packet switch handover prior to the actual establishment of the circuit switched call with the second network.

7. The method of claim 1, further comprising, after the actual establishment of the circuit switched call with the second network, the wireless terminal maintaining and/or starting a packet switched session with the first network by multiplexing transmissions of the circuit switched call and the packet switched session.

8. A wireless terminal capable of communicating with a first network and a second network, the first network being an LTE network, the wireless terminal being configured to:
prior to making a request to participate in a circuit switched call with the second network, camp on a respective selected cell of each of the first network and the second network and thereby tune to both the selected cell for the first network and the selected cell for the second network;
make a request to participate in the circuit switched call through the second network;
in view of already camping on the selected cell of the second network, establish the circuit switched call with the second network without making a measurement with respect to a cell of the second network in a time period between the making of the request to participate in the circuit switch call and establishment of the circuit switched call with the second network; and
wherein the communications interface is configured to listen to both the first network and the second network at a same time, and wherein the wireless terminal further comprises a measurement unit configured to perform measurements on cells of the second network simultaneous with activity toward the first network.

9. The wireless terminal of claim 8, comprising:
a communications interface configured to enable the wireless terminal to communicate over a radio interface with a first radio access technology network and a second radio access technology;
a dual camping unit configured to tune both to the selected cell for the first network and the selected cell for the second network prior to the wireless terminal making a request to participate in a circuit switched call with the second network.

10. The wireless terminal of claim 9, further comprising a circuit switched call manager configured to request to participate in a circuit switched call by generating either a request to establish the circuit switched call or a response to a page for the circuit switched call.

11. The wireless terminal of claim 9, further comprising a measurement unit configured to perform measurements on cells of the second network in gaps of transmissions with the first network.

12. The wireless terminal of claim 9, further comprising a dual camping notifier configured to generate a notification message arranged to notify a mobility management entity (MME) that the wireless terminal is capable of camping on both a cell of the first network and a cell of the second network.

13. The wireless terminal of claim 9, further comprising a packet switched session manager configured, after the actual establishment of the circuit switched call with the second network, to maintaining and/or start a packet switched session with the first network by multiplexing transmissions of the circuit switched call and a packet switched session.

14. A method of operating a base station node of a first network which communicates over a radio interface with a wireless terminal, the first network being a Long Term Evolution (LTE) network, the method comprising:
receiving an indication that the wireless terminal is capable of camping on both a cell of the first network and a cell of the second network and that the wireless terminal is thereby capable of tuning to both a selected cell for the first network and a selected cell for the second network;
receiving a request from the wireless terminal to participate in a circuit switched call with the second network;
in response to the indication the wireless terminal is capable of camping on both a cell of the first network and a cell of the second network, refraining from requesting that the wireless terminal perform a measurement with respect to a cell of the second network in a time period between the receipt of the request to participate in the circuit switch call and actual establishment of the circuit switched call with the second network; and
the base station node scheduling communications between the first network and the wireless terminal in a manner to allow the wireless terminal to perform measurements with respect to cells of the second network in interleaved fashion with the communications between the first network and the wireless terminal.

15. The method of claim 14, further comprising the base station node performing a Radio Resource Control (RRC) connection release procedure and/or cell change order and/or a packet switch handover procedure prior to the actual establishment of the circuit switched call with the second network.

16. The method of claim 14, further comprising the base station node:
authorizing the wireless terminal to establish the circuit switched call with the second network; and thereafter
maintaining and/or starting a packet switched session between the wireless terminal and the first network by multiplexing transmissions of the circuit switched call and the packet switched session.

17. A base station node of a first network which communicates over a radio interface with a wireless terminal, the first network being a Long Term Evolution (LTE) network, the base station node being configured to:
receive and store an indication that the wireless terminal is capable of camping on both a cell of the first network and a cell of the second network and thereby capable of tuning to both a selected cell for the first network and a selected cell for the second network;
receive a request from the wireless terminal to participate in a circuit switched call with the second network; and
in response to the indication the wireless terminal is capable of camping on both a cell of the first network and a cell of the second network, refrain from requesting that the wireless terminal for which the indication is stored perform a measurement with respect to a cell of the second network in a time period between the receipt of the request to participate in the circuit switch call and actual establishment of the circuit switched call with the second network;
the base station node comprising:
a context memory which receives and stores the indication;
a measurement report solicitor configured to refrain from requesting that the wireless terminal for which the indication is stored perform the measurement with respect to the cell of the second network.

18. The base station node of claim 17, further comprising a scheduler configured to schedule communications between the first network and the wireless terminal in a manner to allow the wireless terminal to perform measurements with respect to cells of the second network in interleaved fashion with the communications between the first network and the wireless terminal.

19. The base station node of claim 17, further comprising network transition controller, and wherein the network transition controller takes the form of at least one of the following:
a Radio Resource Control (RRC) connection controller configured to perform a release Radio Resource Control (RRC) connection procedure prior to the actual establishment of the circuit switched call with the second network;
a cell change order controller configured to perform a cell change order prior to the actual establishment of the circuit switched call with the second network;
a packet switch handover controller configured to perform a packet switch handover procedure prior to the actual establishment of the circuit switched call with the second network.

20. The base station node of claim 17, further comprising a scheduler configured to authorize the wireless terminal to establish the circuit switched call with the second network and thereafter maintain and/or start a packet switched session between the wireless terminal and the first network by multiplexing transmissions of the circuit switched call and the packet switched session.

21. The method of claim 1, further comprising establishing the circuit switched call with the selected cell of the second network without making the measurement.

22. The wireless terminal of claim 8, wherein the wireless terminal is configured to establish the circuit switched call with the selected cell of the second network without making the measurement.

23. The method of claim 14, further comprising establishing the circuit switched call with the selected cell of the second network without making the measurement.

\* \* \* \* \*

UNITED STATES PATENT AND TRADEMARK OFFICE
CERTIFICATE OF CORRECTION

PATENT NO. : 8,594,074 B2  
APPLICATION NO. : 12/943736  
DATED : November 26, 2013  
INVENTOR(S) : Olsson et al.

Page 1 of 1

It is certified that error appears in the above-identified patent and that said Letters Patent is hereby corrected as shown below:

On the Title Page, Item (52), under "U.S. Cl.", in Column 1, Line 1, delete "370/33;" and insert -- 370/331; --, therefor.

On Title Page 2, Item (56), under "OTHER PUBLICATIONS", in Column 2, Line 36, delete "Telecommunucations" and insert -- Telecommunications --, therefor.

In the Specification

In Column 11, Line 15, delete "terminal" and insert -- terminal. --, therefor.

In Column 13, Line 27, delete "machine" and insert -- machine. --, therefor.

In Column 14, Line 53, delete "terminal" and insert -- terminal. --, therefor.

Signed and Sealed this
Fifteenth Day of July, 2014

Michelle K. Lee
*Deputy Director of the United States Patent and Trademark Office*